(12) United States Patent
Rosenflanz

(10) Patent No.: US 7,497,093 B2
(45) Date of Patent: Mar. 3, 2009

(54) METHOD OF MAKING CERAMIC ARTICLES

(75) Inventor: Anatoly Z. Rosenflanz, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 500 days.

(21) Appl. No.: 10/901,638

(22) Filed: Jul. 29, 2004

(65) Prior Publication Data

US 2006/0022385 A1 Feb. 2, 2006

(51) Int. Cl.
*C04B 33/34* (2006.01)
(52) U.S. Cl. .................... 65/33.5; 65/33.1; 264/600
(58) Field of Classification Search ............... 65/33.5, 65/33.1; 451/28; 501/127, 41, 10; 51/307–309, 51/298

See application file for complete search history.

(56) References Cited

U.S. PATENT DOCUMENTS

| | | | |
|---|---|---|---|
| 1,768,561 A | 7/1930 | Blatti | |
| 2,206,081 A | 7/1940 | Eberlin | |
| 2,805,166 A | 9/1957 | Loffler | |
| 3,519,448 A | 7/1970 | Alper et al. | |
| 3,635,739 A | 1/1972 | MacDowell et al. | |
| 3,637,361 A | 1/1972 | Kita et al. | |
| 3,650,780 A | 3/1972 | Connelly | |
| 3,754,978 A | 8/1973 | Elmer et al. | |
| 3,926,603 A | 12/1975 | Plesslinger et al. | |
| 3,928,515 A | 12/1975 | Richmond et al. | |
| 3,947,281 A | 3/1976 | Bacon | |
| 4,014,122 A | 3/1977 | Woods | |
| 4,097,295 A | 6/1978 | Chyung et al. | |
| 4,111,668 A | 9/1978 | Walker et al. | |
| 4,111,707 A | 9/1978 | Komorita et al. | |
| 4,182,437 A | 1/1980 | Roberts et al. | |
| 4,217,264 A | 8/1980 | Mabie et al. | |
| 4,271,011 A | 6/1981 | Spencer et al. | |
| 4,341,533 A | 7/1982 | Daire et al. | |
| 4,366,253 A | 12/1982 | Yagi | |
| 4,457,767 A | 7/1984 | Poon et al. | |
| 4,472,511 A | 9/1984 | Mennemann et al. | |
| 4,530,909 A | 7/1985 | Makishima et al. | |
| 4,552,199 A | 11/1985 | Onoyama et al. | |
| 4,584,279 A | 4/1986 | Grabowski et al. | |
| 4,705,656 A | 11/1987 | Onoyama et al. | |
| 4,757,036 A | 7/1988 | Kaar et al. | |
| 4,762,677 A | 8/1988 | Dolgin | |
| 4,770,671 A | 9/1988 | Monroe et al. | |
| 4,772,511 A | 9/1988 | Wood et al. | |
| 4,789,501 A | 12/1988 | Day et al. | |
| 4,812,422 A | 3/1989 | Yuhaku et al. | |
| 4,829,031 A | 5/1989 | Roy et al. | |
| 4,940,678 A | 7/1990 | Aitken | |
| 4,997,461 A | 3/1991 | Markhoff-Matheny et al. | |
| 5,013,696 A | 5/1991 | Greskovich et al. | |
| 5,023,212 A | 6/1991 | Dubots et al. | |
| 5,057,018 A | 10/1991 | Bowen | |
| 5,071,801 A | 12/1991 | Bedard et al. | |
| 5,085,671 A | 2/1992 | Martin et al. | |
| 5,104,830 A | 4/1992 | Drouet et al. | |
| 5,122,176 A | 6/1992 | Goettler | |
| 5,178,335 A | 1/1993 | Mertens | |
| 5,215,563 A | 6/1993 | LaCourse et al. | |
| 5,229,336 A | 7/1993 | Akiyama et al. | |
| 5,336,280 A | 8/1994 | Dubots et al. | |
| 5,348,914 A | 9/1994 | Thometzek et al. | |
| 5,378,662 A | 1/1995 | Tsuyuki | |
| 5,413,974 A | 5/1995 | Yokoyama et al. | |
| 5,449,389 A | 9/1995 | Yoshizumi et al. | |
| 5,484,752 A | 1/1996 | Waku et al. | |
| 5,534,843 A | 7/1996 | Tsunoda et al. | |
| 5,552,213 A | 9/1996 | Eschner | |
| 5,569,547 A | 10/1996 | Waku et al. | |
| 5,605,870 A | 2/1997 | Strom-Olsen et al. | |
| 5,648,302 A | 7/1997 | Brow et al. | |
| 5,665,127 A | 9/1997 | Moltgen et al. | |
| 5,733,178 A | 3/1998 | Obishi | |
| 5,747,397 A | 5/1998 | McPherson et al. | |
| 5,763,345 A | 6/1998 | Ohshima et al. | |
| 5,827,791 A | 10/1998 | Pauliny et al. | |
| 5,839,674 A | 11/1998 | Ellis | |
| 5,856,254 A | 1/1999 | Feige et al. | |
| 5,902,763 A | 5/1999 | Waku et al. | |

(Continued)

FOREIGN PATENT DOCUMENTS

DE 20 34 011 7/1970

(Continued)

OTHER PUBLICATIONS

Bataliants et al., "Application of Low-Temperature Plasma in Glass and Glass Ceramic Industry," TSNIITEI Publishers (1973) pp. 26-27.
Batygin, V.N. et al., "Vacuum-Dense Ceramic and Its Alloys with Metals," Chemical-Mineralogical Composition and Structure.
Kriuchokov, et al., "$Al_2O_3$-$ZRO_2$ Ceramics Med of Powders Obtained by Technique of High-Speed Hardening From Melt," Refractory Materials, (1989) pp. 19-22.
McMillan, P.U., "Glass Ceramic," (1967) pp. 26-27.
Pavlushkin, N.M., "Fundamentals of Glass Technology," Stroyizdat Publishers, (1979) pp. 71-72.
Shvedkov E.L., et al., "Dictionary-Reference Guide of the Metal Powder Industry," Naukova-Dumka, (1982) p. 17.
Strelov, K.K., et al., "Technology of Refractory Materials," Metallurgiya Publishers, (1988), p. 137.

(Continued)

*Primary Examiner*—Carlos Lopez
(74) *Attorney, Agent, or Firm*—Gregory D. Allen

(57) ABSTRACT

Method of making an article, the method comprising coalescing a plurality of the glass particles. Examples of articles include kitchenware (e.g., plates), dental brackets, and reinforcing fibers, cutting tool inserts, abrasives, and structural components of gas engines, (e.g., valves and bearings).

77 Claims, No Drawings

U.S. PATENT DOCUMENTS

| | | | |
|---|---|---|---|
| 5,916,498 | A | 6/1999 | Hofmann et al. |
| 5,952,256 | A | 9/1999 | Morishita et al. |
| 5,976,274 | A | 11/1999 | Inoue et al. |
| 5,981,413 | A | 11/1999 | Hale |
| 5,981,415 | A | 11/1999 | Waku et al. |
| 6,054,093 | A | 4/2000 | Torre, Jr. et al. |
| 6,123,743 | A | 9/2000 | Carman et al. |
| 6,128,430 | A | 10/2000 | Chu et al. |
| 6,214,429 | B1 | 4/2001 | Zou et al. |
| 6,251,813 | B1 | 6/2001 | Sato |
| 6,254,981 | B1 | 7/2001 | Castle |
| 6,268,303 | B1 | 7/2001 | Aitken et al. |
| 6,306,926 | B1 | 10/2001 | Bretscher et al. |
| 6,355,586 | B1 | 3/2002 | Usui et al. |
| 6,362,119 | B1 | 3/2002 | Chiba |
| 6,395,368 | B1 | 5/2002 | Yamaguchi et al. |
| 6,447,937 | B1 | 9/2002 | Murakawa et al. |
| 6,451,077 | B1 | 9/2002 | Rosenflanz |
| 6,454,822 | B1 | 9/2002 | Rosenflanz |
| 6,458,731 | B1 | 10/2002 | Rosenflanz |
| 6,469,825 | B1 | 10/2002 | Digonnet et al. |
| 6,482,758 | B1 | 11/2002 | Weber et al. |
| 6,482,761 | B1 | 11/2002 | Watanabe et al. |
| 6,484,539 | B1 | 11/2002 | Nordine et al. |
| 6,513,739 | B2 | 2/2003 | Fritz et al. |
| 6,557,378 | B2 | 5/2003 | Takagi et al. |
| 6,582,488 | B1 | 6/2003 | Rosenflanz |
| 6,583,080 | B1 | 6/2003 | Rosenflanz |
| 6,589,305 | B1 | 7/2003 | Rosenflanz |
| 6,592,640 | B1 | 7/2003 | Rosenflanz et al. |
| 6,596,041 | B2 | 7/2003 | Rosenflanz |
| 6,607,570 | B1 | 8/2003 | Rosenflanz et al. |
| 6,620,214 | B2 | 9/2003 | McArdle et al. |
| 6,666,750 | B1 | 12/2003 | Rosenflanz |
| 6,669,749 | B1 | 12/2003 | Rosenflanz et al. |
| 6,706,083 | B1 | 3/2004 | Rosenflanz |
| 6,833,014 | B2 | 12/2004 | Welygan et al. |
| 2001/0030811 | A1 | 10/2001 | Kasai et al. |
| 2002/0066233 | A1 | 6/2002 | McArdle et al. |
| 2002/0160694 | A1 | 10/2002 | Wood et al. |
| 2003/0040423 | A1 | 2/2003 | Harada et al. |
| 2003/0110706 | A1 | 6/2003 | Rosenflanz |
| 2003/0110707 | A1 | 6/2003 | Rosenflanz et al. |
| 2003/0110708 | A1 | 6/2003 | Rosenflanz |
| 2003/0110709 | A1 | 6/2003 | Rosenflanz et al. |
| 2003/0115805 | A1 | 6/2003 | Rosenflanz et al. |
| 2003/0126802 | A1 | 7/2003 | Rosenflanz |
| 2003/0126803 | A1 | 7/2003 | Rosenflanz |
| 2003/0126804 | A1 | 7/2003 | Rosenflanz et al. |
| 2003/0145525 | A1 | 8/2003 | Rosenflanz |
| 2004/0020245 | A1 | 2/2004 | Rosenflanz et al. |
| 2004/0023078 | A1 | 2/2004 | Rosenflanz et al. |
| 2004/0148868 | A1 | 8/2004 | Anderson et al. |
| 2004/0148869 | A1 | 8/2004 | Celikkaya et al. |
| 2004/0148870 | A1 | 8/2004 | Celikkaya et al. |
| 2004/0148966 | A1 | 8/2004 | Celikkaya et al. |
| 2004/0148967 | A1 | 8/2004 | Celikkaya et al. |
| 2004/0152034 | A1 | 8/2004 | Cummings et al. |
| 2004/0213539 | A1 | 10/2004 | Anderson et al. |
| 2004/0221515 | A1 | 11/2004 | McArdle et al. |

FOREIGN PATENT DOCUMENTS

| | | |
|---|---|---|
| DE | 3534575 | 4/1986 |
| EP | 0 227 374 | 7/1987 |
| EP | 0 469 271 | 2/1992 |
| EP | 0 494 638 | 7/1992 |
| EP | 0 495 536 A2 | 7/1992 |
| EP | 0 579 281 A1 | 1/1994 |
| EP | 0 709 347 | 5/1996 |
| FR | 1547 989 | 10/1968 |
| FR | 2 118 026 | 7/1972 |
| FR | 2 609 708 | 7/1988 |
| GB | 793503 | 4/1958 |
| GB | 1005338 | 9/1965 |
| GB | 1 260 933 A | 1/1972 |
| GB | 1 411 398 | 10/1975 |
| GB | 2 116 992 | 10/1983 |
| GB | 2 377 438 A | 1/2003 |
| JP | 59 22 7726 A | 12/1984 |
| JP | 60221338 | 11/1985 |
| JP | 61099665 | 5/1986 |
| JP | 62-003041 | 1/1987 |
| JP | S 63-156024 | 6/1988 |
| JP | 02608648 | 9/1988 |
| JP | S 63-303821 | 12/1988 |
| JP | 03-113428 A | 5/1991 |
| JP | HEI 4-119941 | 4/1992 |
| JP | 05-226733 A | 9/1993 |
| JP | 06-171974 | 6/1994 |
| JP | HEI 11-189926 | 7/1999 |
| JP | 11-335136 | 12/1999 |
| JP | 2003-94414 | 4/2003 |
| KR | 9601009 B1 | 1/1996 |
| RU | 1768561 | 10/1992 |
| RU | 2002771 | 11/1993 |
| RU | 1455569 | 10/1996 |
| RU | 2148569 | 10/2000 |
| SU | 1217809 | 3/1986 |
| WO | WO 94/14722 | 7/1994 |
| WO | WO 97/16385 | 5/1997 |
| WO | WO 97/25284 | 7/1997 |
| WO | WO 00/34201 | 6/2000 |
| WO | WO 01/16047 A2 | 3/2001 |
| WO | WO 01/23321 A1 | 4/2001 |
| WO | WO 01/23323 A1 | 4/2001 |
| WO | WO 01/27046 A1 | 4/2001 |
| WO | WO 01/56946 A | 8/2001 |
| WO | WO 01/56947 A | 8/2001 |
| WO | WO 01/56949 A | 8/2001 |
| WO | WO 01/56950 A | 8/2001 |
| WO | WO 02/08146 A | 1/2002 |

OTHER PUBLICATIONS

Zhou, Xinzhang, "Metastable Phase Formation in Plasma-Sprayed $ZrO_2$ $(Y_2O_3)$—$Al_2O_3$," Journal of the American Ceramic Society, vol. 86, No. 8 (2003) pp. 1415-1420.

Aguilar et al, "Melt Extraction Processing of Structural $Y_2O_3$-$Al_2O_3$ Fibers", J. Eur. Ceram. Soc. 20 1091-1098 (2000).

Bagaasen, L.M., et al., "Silicon-free oxynitride glasses via nitridation of aluminate glassmelts" *Journal of the American Ceramic Society*, vol. 66, No. 4, pp. 69-71. (1983).

Brockway et al. "Rapid Solidification of Ceramics a Technology Assessment", *Metals and Ceramics Information Center*, MCIC Report, Jan. 1984 MCIC 84-49.

Coutures et al., "Production and Studies of Alumina Based Refractory Glass," *Mat. Res. Bull.*, vol. 10, No. 6, 1975, pp. 539-546.

Durham, James A. et al., "Low Silica Calcium Aluminate Oxynitride Glasses", *Materials Letters*, vol. 7, No. 5,6, Nov. 1988.

Figs. 311, 346, 350, 354-56, 373, and 716, *Phase Diagrams For Ceramists*, The American Ceramic Society, 1964, pp. 122, 136, 138, 140, 144, 248.

Figs. 2340-44, 2363, 2370, 2374-75, 2382-83, 2385, 2387, 2390, and 2392, *Phase Diagrams For Ceramists, 1969 Supplement*, The American Ceramic Society, 1969, pp. 95-96, 100, 102-103, 105-108.

Figs. 4366-71, 4377-78, 4404-05, 4417, 4426, 4430, 4433, 4437, 4440, 4444, 4457, 4572, and 4602, *Phase Diagrams For Ceramists, 1975 Supplement*, The American Ceramic Society, 1975, pp. 130-132, 135-136, 147, 152, 157, 159-160, 163-164, 166, 172-173, 238, 257.

Figs. 5042, 5211, 5217, 5224, 5228, 5232, 5237, 5239, 5241, 5245, 5251, 5257, 5418, and 5437, *Phase Diagrams For Ceramists, vol. IV*, The American Ceramic Society, 1981, pp. 29, 125, 127, 129-131, 133, 135-137, 139, 141, 143, 220, 228.
Fig. 6464, *Phase Diagrams For Ceramists, vol. VI*, The American Ceramic Society, 1981, p. 162.
Figs. 9262, and 9264, *Phase Diagrams For Ceramists, vol. XI, Oxides*, The American Ceramic Society, 1995, pp. 105-106.
Harris et al., "Durable 3—5 μm Transmiting Infrared Window Materials," Infrared Physics & Technology 39, 1998, pp. 185-201.
Hrovat et al., "Preliminary data on subsolidus phase equilibria in the $La_2O_3$-$Al_2O_3$-$Mn_2O_3$ and $La_2O_3$-$Al_2O_3$-$Fe_2O_3$ systems", *Journal of Materials Sciences Letters*, vol. 14, 1995, pp. 265-267.
Imakoa, Minoru et al., "Refractive Index and Abbe's Number of Glass of Lanthanum Borate System", Journal Ceramic Assoc. Japan, vol. 70, No. 5, (1962), pp. 115.
Isobe, T. et al., "Microstructure and Thermal Stability of $Al_2O_3$/$Y_3Al_5O_{12}$ (YAG) Eutectic Composite Prepared by an Arc Discharge Method", J. Ceram. Soc. Jap., 109, [1], 2001, pp. 66-70, Abstract in English.
Jantzen, C.M., Krepski, R.P., & Herman, H., "Ultra-Rapid Quenching of Laser-Method Binary and Unary Oxides", *Mat. Res. Bull.* 15, 1313-1326 (1980).
Khor K.A., "Novel ZrO2-Mullite Composites Produced By Plasma Spraying", Proceedings of the 15th International Thermal Pray Conference, May 25-29, 1998, Nice, France.
Kingery, W.D., Introduction to Ceramics, Second Edition, Chpt. III subchapter 8.8, Glass-Ceramic Materials, pp. 368-374, (1976).
Kokubo, Tadashi et al., "Infrared Transmission of ($R_2O$ or R'O)-($TiO_2$, $Nb_2O_5$ or $Ta_2O_5$)-$Al_2O_3$ Glasses", Journal of Non-Crystalline Solids 22 (1970) 125-134.
Kondrashov V I et al., "Opacified Glass "Decorit" Synthesis Directions", Steklo I Keramika 2001, No. 1, pp. 8-11. Title translated by Keramika as "Aspects of Synthesis of Decorite Opacified Glass".
Krokhin et al., "Synthesis of Y-Al Garnet", *Glass and Ceramics*, vol. 55, Nos. 5-6, 1998, pp. 151-152.
Lakiza et al., "The Liquidus Surface In The $Al_2O_3$-$ZrO_2$-$Y_2O_3$ Phase Diagram", *Powder Metallurgy and Metal Ceramics*, vol. 33, No. 11-12, 1994, pp. 595-597.
Lakiza et al., "Methods Of Investigation Of Properties Of Powder Materials, Interactions In The $Al_2O_3$-$ZrO_2$-$Y_2O_3$ System", *Powder Metallurgy and Metal Ceramics*, vol. 33, Nos. 9-10, 1994, pp. 486-490.
Lakiza et al., "Powder-Material Research Methods And Properties Polythermal Sections Of The $Al_2O_3$-$ZrO_2$-$Y_2O_3$ Phase Diagram", *Powder Metallurgy and Metal Ceramics*, vol. 34, No. 11-12, 1995, pp. 655-659.
Lakiza et al., "Solidus Surface And Phase Equilibria During The Solidification Of Alloys In The $Al_2O_3$-$ZrO_2$-$Y_2O_3$ System", *Powder Metallurgy and Metal Ceramics*, vol. 34, Nos. 1-2, 1995, pp. 64-67.
Lakiza and Lopato, "Metastable Phase Relationships In The System $Al_2O_3$-$ZrO_2$-$Y_2O_3$", *Powder Metallurgy and Metal Ceramics*, vol. 35, Nos. 11-12, 1996, pp. 621-626.
Mah, Tai-Il et al., "Processing, Microstructure, and Strength of Alumina-YAG Eutectic Polycrystals", J. Am. Ceram. Soc., 83, [8], 2000, pp. 2088-2090.
McKittrick, Joanna, et al., "Non-stoichiometry and defect structures in rapidly solidified $MgO$-$Al_2O_3$-$ZrO_2$ ternary eutectics," *Materials Science and Engineering* A231 (1997) 90-97.
O'Meara, O.C., et al.. "Formation, Crystallisation and Oxidation of Selected Galsses in the Y-Si-Al-O-N System", *Journal of the European Ceramic Society* vol. 8, (1991), pp. 161-170.
Ray, C.S. and Day, D.E., "Determining the Nucleation Rate Curve for Lithium Disilicate Glass by Differential Thermal Anaylsis", J. Am. Ceram. Soc. 73(2) 439-442 (1990).
Rosenflanz, Anatoly et al., "Bulk glasses and ultrahard nanoceramics based on alumina and rare-earth oxides", *Nature*, vol. 430, Aug. 12, 20204, pp. 761-764, www.nature.com/nature.
Sarjeant, P.T, & Roy, R., in *Reactivity of Solids* (ed. J. W. Mitchell, R.C., DeVries, R.W., Roberts and P. Cannon) 725-33 (John Wiley & Sons, Inc., New York 1969).
Schmucker, M, et al., "Constitution of Mullite Glasses Produced by Ultra-Rapid Quenching of Plasma-Sprayed Melts", Journal of the European Ceramic Society 15 (1995) 1201-1205.

Shishido et al., "$Gd_3Al_5O_{12}$ Phase Obtained by Crystallization of Amorphous $Gd_2O_3$-$^5/_3$ $Al_2O_3$," *Journal of the American Ceramic Society*, vol. 61, No. 7-8, Jul.-Aug. 1978, pp. 373-374.
Standard: "Standard Specification for Wire Cloth and Sieves for Testing Purposes[1]," ASTM International, Designation: E 11-01, (date unknown but prior to filing date of instant application), pp. 1-5.
Standard: "Nominal Dimensions, Permissible Variations for Wire Cloth of Standard test Sieves (U.S.A.) Standard Series," ASTM International, Designation: E-11, (Date unknown but prior to filing date of instant application), pp. 3-6.
Standard: "Standard Specification for Industrial Woven Wire Cloth[1]", ASTM International Designation: E 2016-99, (date unknown but prior to filing date of instant application), pp. 1-30.
Stankus, S. V. et al., "Crystallization and Thermal Properties of $Al_2O_3$-$Y_2O_3$ Melts", J. Crystal Growth, 167, 1996, pp. 165-170.
Stookey, S. D., Ceramics Made by Nucleation of Glass-Comparison of Microstructure and Properties with Sintered Ceramics, The American Ceramic Society, (1992), pp. 1-4.
Suzuki et al., "Rapid Quenching on the Binary Systems of High Temperature Oxides," *Mat. Res. Bull.*, vol. 9, 1974, pp. 745-754.
Takamori, T., & Roy, R., "Rapid Crystallization of $SiO_2$-$Al_2O_3$ Glasses", Journal of American Society, vol. 56, No. 12, Dec. 1973.
Toropov et al., "Phase Equilibria in the Yttrium Oxide-Alumina System", *Bulletin of the Academy of Sciences, USSR*, Division of Chemical Science, No. 7, Jul. 1964, pp. 1076-1081, A translation of Seriya Khimicheskaya.
Tredway, W.K., et al., "Multianion glasses", Elsevier Appl. Sci. Publishers, Barking, UK, pp. 203-212, (1986), Conference Date Jul. 10-12, 1985 in Limerick, Ireland.
van den Hoven et al., "Net Optical Gain at 1.53 μm in Er-Doped $Al_2O_3$ Waveguides on Silicon," Appl. Phys. Lett. 68 (14), Apr. 1, 1966, pp. 1886-1888.
Varshneya, Arun K., "Fundamentals of Inorganic Glasses", pp. 425-427 (1994).
Waku et al., "A ductile ceramic eutectic composite with high strength at 1,873 K", Nature, vol. 389, Sep. 1997, pp. 49-52.
Waku, Yoshiharu, "A New Ceramic Eutectic Composite with High Strength at 1873 K", *Advanced Materials*, vol. 10, No. 8, 1998, pp. 615-617.
Waku et al., "High-temperature strength and thermal stability of a unidirectionally solidified $Al_2O_3$/YAG eutectic composite", pp. 1217-1225.
Waku et al., "Sapphire matrix composites reinforced with single crystal YAG phases", *Journal of Materials Science*, vol. 31, 1996, pp. 4663-4670.
Waku, Yoshiharu, et al., "A jelly-like ceramic fiber at 1193 K", Mat Res Innovat, 2000, vol. 3, pp. 185-189.
Wang, S. et al., "Divorced Eutectic and Interface Characteristics in a Solidified YAG-Spinel Composite With Spinel-Rich Composition", J. Mat. Sci., 35, 2000, pp. 2757-2761.
Wang, Shuqiang et al., "Eutectic Precipitation of the Spinel Solid Solution-Yttrium Aluminum Garnet (YAG) System," Journal of the American Ceramic Society, 1998, vol. 81, No. 1, pp. 263-265.
Weber et al., Device Materials Based on Er-, Ho-, Tm-, and Yb-Doped Rare Earth Aluminum Oxide (REAl™) Glass, reference obtained in 2003, and believed to be based on a talk presented Jan. 28, 2003 (See website http://www.spie.org/Conferences/Programs/03/pw/opto/index.cfm?fuseaction=4999, pp. 1 and 2 of 5).
Weber et al., "Rare Earth Oxide-Aluminum Oxide Glasses for Mid-Range IR Devices," reference obtained in 2003, and believed to be based on a talk presented Jan. 25, 2003 (See website http://www.spie.org/Conferences/Programs/03/pw/bios/index.cfm?fuseaction=4957, pp. 1 and 4 of 6).
Weber et al., "Synthesis and Optical Properties of Rare-Earth-Aluminum Oxide Glasses", J. Am. Ceram. Soc. 85(5) 1309-1311 (2002).
Weber, J.K. Richard et al., "Glass fibres of pure and erbium- or neodymium-doped yttria-alumina compositions", Nature, Jun. 25, 1998, vol. 393, pp. 769-771.
Weber, J.K. Richard et al., "Glass Formation and Polyamorphism in Rare-Earth Oxide-Aluminum Oxide Compositions", J. American Ceramic Society, 83 [8], 2000, 1868-1872.
Wilding, M.C., McMillan, P.F., "Polyamorphic Transitions in Yttria-Alumina Liquids", *J. Non-Cryst. Solids*. 293-295, 357-365 (2001).

Wu, Yiquan, et al., "Liquid-phase sintering of alumina with YsialON oxynitride glass", *Materials Letters*, vol. 57 (2003) 3521-3525.

Yajima et al., Glass Formation in the Ln-Al-O System, (Ln: Lanthanoid and Yttrium Elements), Chemistry Letters, 1973, pp. 1327-1330.

Yajima et al., "Unusual Glass Formation in the Al-Nd-O System," Chemistry Letters (published by the Chemical Society of Japan), 1973, pp. 741-742.

Yan et al., "Erbium-Doped Phosphate Glass Waveguide on Silicon With 4.1 dB/cm Gain at 1.535 µm," Appl. Phys. Lett, 71 (20), Nov. 17, 1997.

Yang and Zhu, "Thermo-Mechanical Stability Of Directionally Solidified $Al_2O_3ZrO_2(Y_2O_3)$ Eutectic Fibers", *Scripta Materialia*, vol. 36, No. 8, 1997, pp. 961-965.

Yoshikawa et al., "Phase Identification of $Al_2O_3/RE_3Al_5O_{12}$ and $Al_2O_3/REAlO_3$ (RE=Sm-Lu, Y) Eutectics", J. Crystal Growth, 218, 2000, pp. 67-73.

U.S. Patent Application entitled "Fused $Al_2O_3$-$Y_2O_3$-$ZrO_2$ Eutectic Abrasive Particles, Abrasive Articles, And Methods Of Making And Using The Same", filed Jul. 19, 2000, Rosenflanz having U.S. Appl. No. 09/618,876.

U.S. Patent Application entitled, "Method of Making Ceramic Articles", filed Aug. 2, 2002, Rosenflanz having U.S. Appl. No. 10/211,481.

U.S. Application entitled "Methods of Making Ceramic Particles", filed Sep. 5, 2003, having U.S. Appl. No. 10/655,729.

U.S. Application entitled "Methods of Making Ceramics Comprising $Al_2O_3$, REO, $ZrO_2$ and/or $HfO_2$ and $Nb_2O_5$ and/or $Ta_2O_5$", filed Sep. 18, 2003, having U.S. Appl. No. 10/666,615.

U.S. Application entitled "Alumina-Yttrie Particles and Methods of Making The Same", filed Dec. 18, 2003, having U.S. Appl. No. 10/740,262.

U.S. Application entitled "Ceramics Comprising $Al_2O_3$, REO, $ZrO_2$ and/or $HfO_2$, and $Nb_2O_5$ and/or $Ta_2O_5$, and Methods of Making The Same", filed Sep. 18, 2003, having U.S. Appl. No. 10/666,212.

U.S. Application entitled "Ceramics Comprising $Al_2O_3$, $Y_2O_3$, $ZrO_2$ and/or $HfO_2$, and $Nb_2O_5$ and/or $Ta_2O_5$, and Methods of Making The Same", filed Sep. 18, 2003, having U.S. Appl. No. 10/666,098.

U.S. Application entitled "Method of Making Abrasive Particles", filed Dec. 18, 2003, having U.S. Appl. No. 10/739,420.

U.S. Application entitled "Method of Making Abrasive Particles," filed Dec. 18, 2003, having U.S. Appl. No. 10/739,624.

U.S. Application entitled "Transparent Fused Crystalline Ceramics, And Method of Making The Same", filed Dec. 18, 2003, having U.S. Appl. No. 10/739,439.

U.S. Application entitled "Method of Making Abrasive Particles", filed Dec. 18, 2003, having U.S. Appl. No. 10/739,440.

U.S. Application entitled "Method of Making Abrasive Particles", filed Dec. 18, 2003, having U.S. Appl. No. 10/740,096.

U.S. Application entitled "Method of Making Abrasive Particles", filed Dec. 18, 2003, having U.S. Appl. No. 10/739,441.

U.S. Application entitled "Powder Feeding Method and Apparatus", filed Dec. 18, 2003, having U.S. Appl. No. 10/739,233.

U.S. Application entitled "Ceramics, and Methods of Making and Using the Same", filed Jul. 29, 2004.

METHOD OF MAKING CERAMIC ARTICLES

BACKGROUND

A number of amorphous materials (e.g., glass) and glass-ceramic compositions are known. Some amorphous materials can be consolidated via coalescing to provide articles, including articles having complex shapes (see, e.g., PCT publication No. 03/011776, published Feb. 13, 2003).

Various pressure-assisted consolidation methods are known in the ceramic art, and include hot-pressing, die-extrusion, hot-isostatic pressing, sinter-forging and variations of thereof. These consolidation methods are generally assisted by application of external force either directly through the use of punches as in hot-pressing, die-extrusion and sinter-forging, or indirectly through gas pressurization of a sealed container as in hot-isostatic pressing. In the latter method, the material to be consolidated is placed in a container (e.g., a metal container) and evacuated and sealed from an atmosphere. The sealed material is mechanical pressed thereby isostatically pressurizing the container with gas and causing the container to shrink.

Some amorphous compositions can be heat-treated to form glass-ceramics. The glass-ceramics tend to be more temperature resistant than the glass from which they are formed.

It is desirable to provide articles, including articles having complex shapes, comprising amorphous and glass-ceramics materials.

SUMMARY OF THE INVENTION

The present invention provides a method of making articles from glass. Optionally, the articles may be a composite of two or more different glass compositions. In some embodiments, the glass is optionally heat-treated to at least partially crystallize the glass and provide a glass-ceramic.

One embodiment of the present invention provides a method of making an article, the method comprising:

providing a substrate (e.g., ceramics, metals, intermetallics, and composites thereof) having an outer surface;

providing at least a glass (i.e., at least one glass) (e.g., in the form of a sheet(s), particle(s) (including a microsphere(s), and fiber(s)) having an outer surface (wherein if the glass is in the form of a sheet(s), particle(s), and/or a fiber(s), etc., it is understood that there are outer surfaces), wherein the glass comprises at least two different metal oxides (i.e., the metal oxides do not have the same cation(s)), wherein the glass has a $T_g$ and $T_x$, and wherein the difference between the $T_g$ and the $T_x$ of the glass is at least 5K (or even, at least 10K, at least 15K, at least 20K, at least 25K, at least 30K, or at least 35K), the glass containing less than 20% by weight $SiO_2$ (or even less than 15%, less than 10%, less than 5% by weight, or even zero percent, by weight, $SiO_2$), less than 20% by weight $B_2O_3$ (or even less than 15%, less than 10%, less than 5% by weight, or even zero percent, by weight, $B_2O_3$), and less than 40% by weight $P_2O_5$ (or even less than 35%, less than 30%, less than 25%, less than 20%, less than 15%, less than 10%, less than 5% by weight, or even zero percent, by weight, $P_2O_5$);

heating the glass above the $T_g$ such that at least a portion of the glass wets at least a portion of the outer surface of the substrate and provides an article comprising the glass attached to the at least a portion of the outer surface of the substrate, wherein the heating of the glass is conducted in a gaseous atmosphere at a pressure greater than 1.1 atmosphere (atm.) (in some embodiments, at a pressure greater than 1.25 atm., 1.5 atm., 2 atm., 5 atm., or even greater than 10 atm.) sufficient to increase the rate of densification of the glass as compared to the same glass heated in the same manner except the pressure during the later heating is conducted in an atmosphere at a pressure of 1.0 atm., and wherein the gaseous atmosphere at a pressure greater than 1.1 atm. (in some embodiments, at a pressure greater than 1.25 atm., 1.5 atm., 2 atm., 5 atm., or even greater than 10 atm.) is in direct contact with at least a portion of the outer surface of the glass. Optionally, the method can be practiced with a second, a third, or more, different glass, including glasses having, respectively, a $T_g$ and $T_x$, and wherein the difference between the $T_g$ and the $T_x$ for at least one additional glass (in some embodiments, between each respective $T_g$ and $T_x$) is at least 5K (or even, at least 10K, at least 15K, at least 20K, at least 25K, at least 30K, or at least 35K), one or more of the additional glasses optionally contain less than 20% by weight $SiO_2$ (or even less than 15%, less than 10%, less than 5% by weight, or even zero percent, by weight, $SiO_2$), less than 20% by weight $B_2O_3$ (or even less than 15%, less than 10%, less than 5% by weight, or even zero percent, by weight, $B_2O_3$), and less than 40% by weight $P_2O_5$ (or even less than 35%, less than 30%, less than 25%, less than 20%, less than 15%, less than 10%, less than 5% by weight, or even zero percent, by weight, $P_2O_5$). In some embodiments, the glass, or if more than one glass is used, at least one of the glasses, comprises less than 40 percent (in some embodiments, less than 35, 30, 25, 20, 15, 10, 5, or even 0) by weight glass collectively $SiO_2$, $B_2O_3$, and $P_2O_5$, based on the total weight of the glass. In some embodiments, the increased rate of densification of the glass is by a factor of at least 1.1, 1.25, 1.5, 2, or even at least 3.

Another embodiment of the present invention provides a method of making an article, the method comprising:

providing a substrate (e.g., ceramics, metals, intermetallics, and composites thereof) having an outer surface;

providing at least a plurality of particles comprising glass (including glass particles), the particles comprising glass having an outer surface, wherein the glass comprises at least two different metal oxides, wherein the glass has a $T_g$ and $T_x$, and wherein the difference between the $T_g$ and the $T_x$ of the glass is at least 5K or even, at least 10K, at least 15K, at least 20K, at least 25K, at least 30K, or at least 35K), the glass containing less than 20% by weight $SiO_2$ (or even less than 15%, less than 10%, less than 5% by weight, or even zero percent, by weight, $SiO_2$), less than 20% by weight $B_2O_3$ (or even less than 15%, less than 10%, less than 5% by weight, or even zero percent, by weight, $B_2O_3$), and less than 40% by weight $P_2O_5$ (or even less than 35%, less than 30%, less than 25%, less than 20%, less than 15%, less than 10%, less than 5% by weight, or even zero percent, by weight, $P_2O_5$);

heating the glass above the $T_g$ such that at least a portion of the glass of the plurality of particles wets at least a portion of the outer surface of the substrate and provides an article comprising the glass attached to the at least a portion of the outer surface of the substrate, wherein the heating of the glass is conducted in a gaseous atmosphere at a pressure greater than 1.1 atm. (in some embodiments, at a pressure greater than 1.25 atm., 1.5 atm., 2 atm., 5 atm., or even greater than 10 atm.) sufficient to increase the rate of densification of the glass as compared to the same glass heated in the same manner except the pressure during the later heating is conducted in an atmosphere at a pressure of 1.0 atm., and wherein the gaseous atmosphere at a pressure greater than 1.1 atm. (in some embodiments, at a pressure greater than 1.25 atm., 1.5 atm., 2 atm., 5 atm., or even greater than 10 atm.) is in direct contact with at least a portion of the outer surface of at least a portion the particles comprising glass. Optionally, the method can be practiced with a second, a third, or more, different pluralities of particles comprising glass (i.e., each plurality comprising different glasses), including glasses having, respectively, a $T_g$ and $T_x$, and wherein the difference the $T_g$ and the $T_x$ for at least one additional glass (in some embodiments, between each respective $T_g$ and $T_x$) $T_x$ is at least 5K (or even, at least 10K, at least 15K, at least 20K, at least 25K, at least 30K, or at least 35K), one or more of the additional glasses optionally contain less than 20% by weight $SiO_2$ (or even less than 15%, less than 10%, less than 5% by weight, or even zero percent, by weight, $SiO_2$), less than 20% by weight $B_2O_3$ (or even less than 15%, less than 10%, less than 5% by weight, or even zero percent, by weight, $B_2O_3$), and less than 40% by weight $P_2O_5$ (or even less than 35%, less than 30%, less than 25%, less than 20%, less than 15%, less than 10%, less than 5% by weight, or even zero percent, by weight, $P_2O_5$). In some embodiments, the glass, or if more than one glass is used, at least one of the glasses, comprises less than 40 (in some embodiments, less than 35, 30, 25, 20, 15, 10, 5, or even 0) percent by weight glass collectively $SiO_2$, $B_2O_3$, and $P_2O_5$, based on the total weight of the glass. In some embodiments, the increased rate of densification of the glass is by a factor of at least 1.1, 1.25, 1.5, 2, or even at least 3.

Another embodiment of the present invention provides a method of making an article, the method comprising:

providing at least a first glass and second glass (e.g., sheets, particles (including microspheres), and fibers) each having an outer surface, wherein the first glass comprises at least two different metal oxides, wherein the first glass has a $T_{g1}$ and $T_{x1}$, and wherein the difference between the $T_{g1}$ and the $T_{x1}$ is at least 5K (or even, at least 10K, at least 15K, at least 20K, at least 25K, at least 30K, or at least 35K), the first glass containing less than 20% by weight $SiO_2$ (or even less than 15%, less than 10%, less than 5% by weight, or even zero percent, by weight, $SiO_2$), less than 20% by weight $B_2O_3$ (or even less than 15%, less than 10%, less than 5% by weight, or even zero percent, by weight, $B_2O_3$), and less than 40% by weight $P_2O_5$ (or even less than 35%, less than 30%, less than 25%, less than 20%, less than 15%, less than 10%, less than 5% by weight, or even zero percent, by weight, $P_2O_5$);

heating the first and second glasses above at least $T_{g1}$ and at least the first glass coalescing with the second glass to provide the article, wherein the heating of the glass is conducted in a gaseous atmosphere at a pressure greater than 1.1 atm. (in some embodiments, at a pressure greater than 1.25 atm., 1.5 atm., 2 atm., 5 atm., or even greater than 10 atm.) sufficient to increase the rate of densification of the glass as compared to the same glass heated in the same manner except the pressure during the later heating is conducted in an atmosphere at a pressure of 1.0 atm., and wherein the gaseous atmosphere at a pressure greater than 1.1 atm. (in some embodiments, at a pressure greater than 1.25 atm., 1.5 atm., 2 atm., 5 atm., or even greater than 10 atm.) is in direct contact with at least a portion of the outer surfaces of the first and second glasses. Optionally, the second glass has a $T_{g2}$ and $T_{x2}$, wherein the difference between $T_{g2}$ and $T_{x2}$ is at least 5K (or even, at least 10K, at least 15K, at least 20K, at least 25K, at least 30K, or at least 35K). Optionally, the second glass contains less than 20% by weight $SiO_2$ (or even less than 15%, less than 10%, less than 5% by weight, or even zero percent, by weight, $SiO_2$), less than 20% by weight $B_2O_3$ (or even less than 15%, less than 10%, less than 5% by weight, or even zero percent, by weight, $B_2O_3$), and less than 40% by weight $P_2O_5$ (or even less than 35%, less than 30%, less than 25%, less than 20%, less than 15%, less than 10%, less than 5% by weight, or even zero percent, by weight, $P_2O_5$). Optionally, the method can be practiced with a third, a fourth, glass, etc. including glasses having, respectively, a $T_g$ and $T_x$, and wherein the difference between the $T_g$ and the $T_x$ for at least one additional glass (in some embodiments, between each respective $T_g$ and $T_x$) is at least 5K (or even, at least 10K, at least 15K, at least 20K, at least 25K, at least 30K, or at least 35K), one or more of the additional glasses optionally contain less than 20% by weight $SiO_2$ (or even less than 15%, less than 10%, less than 5% by weight, or even zero percent, by weight, $SiO_2$), less than 20% by weight $B_2O_3$ (or even less than 15%, less than 10%, less than 5% by weight, or even zero percent, by weight, $B_2O_3$), and less than 40% by weight $P_2O_5$ (or even less than 35%, less than 30%, less than 25%, less than 20%, less than 15%, less than 10%, less than 5% by weight, or even zero percent, by weight, $P_2O_5$). The glasses may have the same composition, different composition, or combinations thereof. In some embodiments, at least one of the glasses comprise less than 40 (in some embodiments, less than 35, 30, 25, 20, 15, 10, 5, or even 0) percent by weight glass collectively $SiO_2$, $B_2O_3$, and $P_2O_5$, based on the total weight of the glass. In some embodiments, the increased rate of densification of the glass is by a factor of at least 1.1, 1.25, 1.5, 2, or even at least 3.

Another embodiment of the present invention provides a method of making an article, the method comprising:

providing at least a first glass and second glass (e.g., sheets, particles (including microspheres), and fibers) each having an outer surface, wherein the first glass comprises at least two different metal oxides, wherein the first glass has a $T_{g1}$ and $T_{x1}$, and wherein the difference between the $T_{g1}$ and the $T_{x1}$ is at least 5K (or even, at least 10K, at least 15K, at least 20K, at least 25K, at least 30K, or at least 35K), the first glass containing less than 20% by weight $SiO_2$ (or even less than 15%, less than 10%, less than 5% by weight, or even zero percent, by weight, $SiO_2$), less than 20% by weight $B_2O_3$ (or even less than 15%, less than 10%, less than 5% by weight, or even zero percent, by weight, $B_2O_3$), and less than 40% by weight $P_2O_5$ (or even less than 35%, less than 30%, less than 25%, less than 20%, less than 15%, less than 10%, less than 5% by weight, or even zero percent, by weight, $P_2O_5$), and wherein the second glass comprises at least two different metal oxides, wherein the second glass has a $T_{g2}$ and $T_{x2}$, and wherein the difference between the $T_{g2}$ and the $T_{x2}$ is at least 5K, the second glass containing less than 20% by weight $SiO_2$ (or even less than 15%, less than 10%, less than 5% by weight, or even zero percent, by weight, $SiO_2$), less than 20% by weight $B_2O_3$ (or even less than 15%, less than 10%, less than 5% by weight, or even zero percent, by weight, $B_2O_3$), and less than 40% by weight $P_2O_5$ (or even less than 35%, less than 30%, less than 25%, less than 20%, less than 15%, less than 10%, less than 5% by weight, or even zero percent, by weight, $P_2O_5$);

heating the glasses above the higher of $T_{g1}$ or $T_{g2}$ and coalescing the first and second glasses to provide the article, wherein the heating of the glass is conducted in a gaseous atmosphere at a pressure greater than 1.1 atm. (in some embodiments, at a pressure greater than 1.25 atm., 1.5 atm., 2 atm., 5 atm., or even greater than 10 atm.) sufficient to increase the rate of densification of the glass as compared to the same glass heated in the same manner except the pressure during the later heating is conducted in an atmosphere at a pressure of 1.0 atm., and wherein the gaseous atmosphere at a pressure greater than 1.1 atm. (in some embodiments, at a pressure greater than 1.25 atm., 1.5 atm., 2 atm., 5 atm., or even greater than 10 atm.) is in direct contact with at least a portion of the outer surfaces of the first and second glasses. Optionally, the method can be practices with a third, a fourth, glass, etc. including glasses having, respectively, a $T_g$ and $T_x$, and wherein the difference between the $T_g$ and the $T_x$ for at least one additional glass (in some embodiments, between each respective $T_g$ and $T_x$) is at least 5K (or even, at least 10K, at least 15K, at least 20K, at least 25K, at least 30K, or at least 35K), one or more of the additional glasses optionally contain less than 20% by weight $SiO_2$ (or even less than 15%, less than 10%, less than 5% by weight, or even zero percent, by weight, $SiO_2$), less than 20% by weight $B_2O_3$ (or even less than 15%, less than 10%, less than 5% by weight, or even zero percent, by weight, $B_2O_3$), and less than 40% by weight $P_2O_5$ (or even less than 35%, less than 30%, less than 25%, less than 20%, less than 15%, less than 10%, less than 5% by weight, or even zero percent, by weight, $P_2O_5$). The glasses may have the same composition, different composition, or combinations thereof. In some embodiments, at least one of the glasses comprise less than 40 (in some embodiments, less than 35, 30, 25, 20, 15, 10, 5, or even 0) percent by weight glass collectively $SiO_2$, $B_2O_3$, and $P_2O_5$, based on the total weight of the glass. In some embodiments, the increased rate of densification of the glass is by a factor of at least 1.1, 1.25, 1.5, 2, or even at least 3.

Another embodiment of the present invention provides a method of making an article, the method comprising:

providing at least a first plurality of particles comprising glass (including glass particles), the particles comprising glass having an outer surface, wherein the glass comprises at least two different metal oxides, wherein the glass has a $T_g$ and $T_x$, and wherein the difference between the $T_g$ and the $T_x$ of the glass is at least 5K (or even, at least 10K, at least 15K, at least 20K, at least 25K, at least 30K, or at least 35K), the glass containing less than 20% by weight $SiO_2$ (or even less than 15%, less than 10%, less than 5% by weight, or even zero percent, by weight, $SiO_2$), less than 20% by weight $B_2O_3$ (or even less than 15%, less than 10%, less than 5% by weight, or even zero percent, by weight, $B_2O_3$), and less than 40% by weight $P_2O_5$ (or even less than 35%, less than 30%, less than 25%, less than 20%, less than 15%, less than 10%, less than 5% by weight, or even zero percent, by weight, $P_2O_5$);

heating the glass above the $T_g$ and coalescing at least a portion of the first plurality of particles to provide the article, wherein the heating of the glass is conducted in a gaseous atmosphere at a pressure greater than 1.1 atm. (in some embodiments, at a pressure greater than 1.25 atm., 1.5 atm., 2 atm., 5 atm., or even greater than 10 atm.) sufficient to increase the rate of densification of the glass as compared to the same glass heated in the same manner except the pressure during the later heating is conducted in an atmosphere at a pressure of 1.0 atm., and wherein the gaseous atmosphere at a pressure greater than 1.1 atm. (in some embodiments, at a pressure greater than 1.25 atm., 1.5 atm., 2 atm., 5 atm., or even greater than 10 atm.) is in direct contact with at least a portion of the outer surface of at least a portion the particles comprising glass. In some embodiments, the ceramic is glass. Optionally, the method can be practiced with a second, a third, or more, different pluralities of particles comprising glass (i.e., each plurality comprising different glasses), including glasses having, respectively, a $T_g$ and $T_x$, and wherein the difference between the $T_g$ and the $T_x$ for at least one additional glass (in some embodiments, between each respective $T_g$ and $T_x$) is at least 5K (or even, at least 10K, at least 15K, at least 20K, at least 25K, at least 30K, or at least 35K), one or more of the additional glasses optionally contain less than 20% by weight $SiO_2$ (or even less than 15%, less than 10%, less than 5% by weight, or even zero percent, by weight, $SiO_2$), less than 20% by weight $B_2O_3$ (or even less than 15%, less than 10%, less than 5% by weight, or even zero percent, by weight, $B_2O_3$), and less than 40% by weight $P_2O_5$ (or even less than 35%, less than 30%, less than 25%, less than 20%, less than 15%, less than 10%, less than 5% by weight, or even zero percent, by weight, $P_2O_5$). In some embodiments, the glass, or if more than one glass is used, at least one of the glasses, comprises less than 40 (in some embodiments, less than 35, 30, 25, 20, 15, 10, 5, or even 0) percent by weight glass collectively $SiO_2$, $B_2O_3$, and $P_2O_5$, based on the total weight of the glass. In some embodiments, the increased rate of densification of the glass is by a factor of at least 1.1, 1.25, 1.5, 2, or even at least 3.

Desirably, the ratio of a $T_g$ to $T_1$ is at least 0.5. Examples of useful glass particles include those comprising REO-$Al_2O_3$—$ZrO_2$, $Y_2O_3$—$Al_2O_3$—$ZrO_2$, REO-$Al_2O_3$—$ZrO_2$—$SiO_2$, and $Y_2O_3$—$Al_2O_3$—$ZrO_2$—$SiO_2$ glasses. Other useful glasses may also include REO (i.e., rare earth oxide(s))-$Al_2O_3$ and $Y_2O_3$—$Al_2O_3$ glasses.

Embodiments of the method according to the present invention, including for certain ceramic compositions, allow for the formation of article shapes and sizes that were obtainable from conventional methods. Coalescence of the glass is typically enhanced if the glass is under pressure during heating. In one embodiment, a charge of glass (e.g., particles (including beads), fibers, etc.) is placed into a die and hot-pressing is performed at temperatures above glass transition where viscous flow of glass leads to coalescence into an article.

In this application:

"amorphous material" refers to material derived from a melt and/or a vapor phase that lacks any long range crystal structure as determined by X-ray diffraction and/or has an exothermic peak corresponding to the crystallization of the amorphous material as determined by a DTA (differential thermal analysis) as determined by the test described herein entitled "Differential Thermal Analysis";

"ceramic" refers to glass, crystalline ceramic, glass-ceramic, and combinations thereof;

"glass" refers to amorphous material exhibiting a glass transition temperature;

"glass-ceramic" refers to ceramic comprising crystals formed by heat-treating glass;

"rare earth oxides" refers to cerium oxide (e.g., $CeO_2$), dysprosium oxide (e.g., $Dy_2O_3$), erbium oxide (e.g., $Er_2O_3$), europium oxide (e.g., $Eu_2O_3$), gadolinium oxide (e.g., $Gd_2O_3$), holmium oxide (e.g., $Ho_2O_3$), lanthanum oxide (e.g., $La_2O_3$), lutetium oxide (e.g., $Lu_2O_3$), neodymium oxide (e.g., $Nd_2O_3$), praseodymium oxide (e.g., $Pr_6O_{11}$), samarium oxide (e.g., $Sm_2O_3$), terbium oxide (e.g., $Tb_2O_3$), thorium oxide (e.g., $Th_4O_7$), thulium (e.g., $Tm_2O_3$), and ytterbium oxide (e.g., $Yb_2O_3$), and combinations thereof;

"REO" refers to rare earth oxide(s);

"$T_g$" refers to the glass transition temperature as determined in Example 1;

"$T_1$" refers to the glass melting point; and

"$T_x$" refers to crystallization onset temperature as determined in Example 1.

Further, it is understood herein that unless it is stated that a metal oxide (e.g., $Al_2O_3$, complex $Al_2O_3$.metal oxide, etc.) is crystalline, for example, in a glass-ceramic, it may be glass, crystalline, or portions glass and portions crystalline. For example, if a glass-ceramic comprises $Al_2O_3$ and $ZrO_2$, the $Al_2O_3$ and $ZrO_2$ may each be in a glass state, crystalline state, or portions in a glass state and portions in a crystalline state, or even as a reaction product with another metal oxide(s) (e.g., unless it is stated that, for example, $Al_2O_3$ is present as crystalline $Al_2O_3$ or a specific crystalline phase of $Al_2O_3$ (e.g., alpha $Al_2O_3$), it may be present as crystalline $Al_2O_3$ and/or as part of one or more crystalline complex $Al_2O_3$.metal oxides.

Increased densification rates are advantageous because they typically facilitate improved processability, lower energy consumption, and shorter processing times.

Optionally, certain glass articles made according to the present invention can be heat-treated to convert at least a portion of the glass to crystalline ceramic and provide glass-ceramic.

DETAILED DESCRIPTION

In general, glasses and ceramics comprising glass useful in practicing the method of the present invention can be made by heating (including in a flame) the appropriate metal oxide sources to form a melt, desirably a homogenous melt, and then rapidly cooling the melt to provide glass or ceramic comprising glass.

Examples of useful glass for carrying out the present invention include those comprising REO-$Al_2O_3$—$ZrO_2$, $Y_2O_3$—$Al_2O_3$—$ZrO_2$, REO-$Al_2O_3$—$ZrO_2$—$SiO_2$, and $Y_2O_3$—$Al_2O_3$—$ZrO_2$—$SiO_2$ glasses. Other useful glasses may also include REO (i.e., rare earth oxide(s))-$Al_2O_3$ and $Y_2O_3$—$Al_2O_3$ glasses. Useful glass formulations include those at or near a eutectic composition. In addition to the REO-$Al_2O_3$—$ZrO_2$, $Y_2O_3$—$Al_2O_3$—$ZrO_2$, REO-$Al_2O_3$—$ZrO_2$—$SiO_2$, and $Y_2O_3$—$Al_2O_3$—$ZrO_2$—$SiO_2$ compositions disclosed herein, other compositions, including eutectic compositions, will be apparent to those skilled in the art after reviewing the present disclosure. For example, phase diagrams depicting various compositions, including eutectic compositions, are known in the art.

Examples of optional metal oxides (i.e., metal oxides beyond those needed for the general composition) may include, on a theoretical oxide basis, $Al_2O_3$, BaO, CaO, $Cr_2O_3$, CoO, CuO, $Fe_2O_3$, $GeO_2$, $HfO_2$, $Li_2O$, MgO, MnO, $Nb_2O_5$, NiO, $Na_2O$, $P_2O_5$, rare earth oxides, $Sc_2O_3$, $SiO_2$, SrO, $Ta_2O_5$, $TeO_2$, $TiO_2$, $V_2O_3$, $Y_2O_3$, ZnO, $ZrO_2$, and combinations thereof.

Sources, including commercial sources, of metal oxides such as $Al_2O_3$, BaO, CaO, CuO, rare earth oxides (e.g., $CeO_2$, $Dy_2O_3$, $Er_2O_3$, $Eu_2O_3$, $Gd_2O_3$, $Ho_2O_3$, $La_2O_3$, $Lu_2O_3$, $Nb_2O_5$, $Nd_2O_3$, $Pr_6O_{11}$, $Sm_2O_3$, $Ta_2O_5$, $Th_4O_7$, $Tm_2O_3$, and $Yb_2O_3$, and combinations thereof), $TiO_2$, $ZrO_2$ are known in the art, and include the oxides themselves, complex oxides, ores, carbonates, acetates, nitrates, chlorides, hydroxides, etc.

Further, for example sources of (on a theoretical oxide basis) $Al_2O_3$ include bauxite (including both natural occurring bauxite and synthetically produced bauxite), calcined bauxite, hydrated aluminas (e.g., boehmite and gibbsite), aluminum, Bayer process alumina, aluminum ore, gamma alumina, alpha alumina, aluminum salts, aluminum nitrates, and combinations thereof. The $Al_2O_3$ source may contain, or only provide, $Al_2O_3$. Alternatively, the $Al_2O_3$ source may contain, or provide $Al_2O_3$, as well as one or more metal oxides other than $Al_2O_3$ (including materials of or containing complex $Al_2O_3$.metal oxides (e.g., $Dy_3Al_5O_{12}$, $Y_3Al_5O_{12}$, $CeAl_{11}O_{18}$, etc.)).

Sources, including commercial sources, of rare earth oxides include rare earth oxide powders, rare earth metals, rare earth-containing ores (e.g., bastnasite and monazite), rare earth salts, rare earth nitrates, and rare earth carbonates. The rare earth oxide(s) source may contain, or only provide, rare earth oxide(s). Alternatively, the rare earth oxide(s) source may contain, or provide rare earth oxide(s), as well as one or more metal oxides other than rare earth oxide(s) (including materials of or containing complex rare earth oxide•other metal oxides (e.g., $Dy_3Al_5O_{12}$, $CeAl_{11}O_{18}$, etc.)).

Sources, including commercial sources, of (on a theoretical oxide basis) $ZrO_2$ include zirconium oxide powders, zircon sand, zirconium, zirconium-containing ores, and zirconium salts (e.g., zirconium carbonates, acetates, nitrates, chlorides, hydroxides, and combinations thereof). In addition, or alternatively, the $ZrO_2$ source may contain, or provide $ZrO_2$, as well as other metal oxides such as hafnia. Sources, including commercial sources, of (on a theoretical oxide basis) $HfO_2$ include hafnium oxide powders, hafnium, hafnium-containing ores, and hafnium salts. In addition, or alternatively, the $HfO_2$ source may contain, or provide $HfO_2$, as well as other metal oxides such as $ZrO_2$.

Sources, including commercial sources, of BaO include barium oxide powders, barium-containing ores, barium salts, barium nitrates, and barium carbonates. The barium oxide source may contain, or only provide, barium oxide. Alternatively, the barium oxide source may contain, or provide barium oxide, as well as one or more metal oxides other than barium oxide (including materials of or containing complex barium oxide•other metal oxides).

Sources, including commercial sources, of CaO include calcium oxide powders and calcium-containing ores. The calcium oxide(s) source may contain, or only provide, calcium oxide. Alternatively, the calcium oxide source may contain, or provide calcium oxide, as well as one or more metal oxides other than calcium oxide (including materials of or containing complex calcium oxide other metal oxides).

Sources, including commercial sources, of $Nb_2O_5$ include niobium oxide powders, niobium containing ores (e.g., columbite, tantalite, and euxelite), niobium salts, niobium metals, and combinations thereof.

Sources, including commercial sources, of $Ta_2O_5$ include tantalum oxide powders, tantalum containing ores (e.g., columbite, tantalite, and euxelite), tantalum salts, tantalum metals, and combinations thereof.

Sources, including commercial sources, of rare earth oxides include rare earth oxide powders, rare earth metals, rare earth-containing ores (e.g., bastnasite and monazite), rare earth salts, rare earth nitrates, and rare earth carbonates. The rare earth oxide(s) source may contain, or only provide, rare earth oxide(s). Alternatively, the rare earth oxide(s) source may contain, or provide rare earth oxide(s), as well as one or more metal oxides other than rare earth oxide(s) (including materials of or containing complex rare earth oxide other metal oxides (e.g., $Dy_3Al_5O_{12}$, $CeAl_{11}O_{18}$, etc.)).

Sources, including commercial sources, of $SiO_2$ include silica powders, silicon metals, silicon-containing ores. The silicon oxide source may contain, or only provide, silicon oxide. Alternatively, the silicon oxide source may contain, or provide silicon oxide, as well as one or more metal oxides other than silicon oxide (including materials of or containing complex silicon oxide other metal oxides).

Sources, including commercial sources, of SrO include strontium oxide powders, strontium carbonates, and strontium-containing ores. The strontium oxide source may contain, or only provide, strontium oxide. Alternatively, the strontium oxide source may contain, or provide strontium oxide, as well as one or more metal oxides other than strontium oxide (including materials of or containing complex strontium oxide•other metal oxides).

Sources, including commercial sources, of $TiO_2$ include titanium oxide powders, titanium metals and titanium-containing ores. The titanium oxide source may contain, or only provide, titanium oxide. Alternatively, the titanium oxide source may contain, or provide titanium oxide, as well as one or more metal oxides other than titanium oxide (including materials of or containing complex titanium oxide•other metal oxides).

Sources, including commercial sources, of (on a theoretical oxide basis) $Y_2O_3$ include yttrium oxide powders, yttrium, yttrium-containing ores, and yttrium salts (e.g., yttrium carbonates, nitrates, chlorides, hydroxides, and combinations thereof). The $Y_2O_3$ source may contain, or only provide, $Y_2O_3$. Alternatively, the $Y_2O_3$ source may contain, or provide $Y_2O_3$, as well as one or more metal oxides other than $Y_2O_3$ (including materials of or containing complex $Y_2O_3$.metal oxides (e.g., $Y_3Al_5O_{12}$)).

Sources, including commercial sources, of (on a theoretical oxide basis) $ZrO_2$ include zirconium oxide powders, zircon sand, zirconium, zirconium-containing ores, and zirconium salts (e.g., zirconium carbonates, acetates, nitrates, chlorides, hydroxides, and combinations thereof). In addition, or alternatively, the $ZrO_2$ source may contain, or provide $ZrO_2$, as well as other metal oxides such as hafnia. Sources, including commercial sources, of (on a theoretical oxide basis) $HfO_2$ include hafnium oxide powders, hafnium, hafnium-containing ores, and hafnium salts. In addition, or alternatively, the $HfO_2$ source may contain, or provide $HfO_2$, as well as other metal oxides such as $ZrO_2$.

Optionally, ceramics according to the present invention further comprise additional metal oxides beyond those needed for the general composition. The addition of certain metal oxides may alter the properties and/or the crystalline structure or microstructure of ceramics made according to the present invention, as well as the processing of the raw materials and intermediates in making the ceramic. For example, oxide additions such as MgO, CaO, $Li_2O$, and $Na_2O$ have been observed to alter both the $T_g$ and $T_x$ of glass. Although not wishing to be bound by theory, it is believed that such additions influence glass formation. Further, for example, such oxide additions may decrease the melting temperature of the overall system (i.e., drive the system toward lower melting eutectic), and ease of glass-formation. Complex eutectics in multi component systems (quaternary, etc.) may result in better glass-forming ability. The viscosity of the liquid melt and viscosity of the glass in its' "working" range may also be affected by the addition of metal oxides beyond those needed for the general composition.

The inclusion of at least one of $Nb_2O_5$ or $Ta_2O_5$ glasses comprising $Al_2O_3$, REO, and at least one of $ZrO_2$ or $HfO_2$, can significantly influence the crystallization of the glasses (e.g., increases the rate of at least one of crystalline $Zro_2$ or crystalline $HfO_2$ formation from the glass (in some embodiments, by at least a factor of 1.5, 2, 2.5, or even at least 3 as compared to a comparative glass-ceramic made by heat-treating, in the same manner, the same glass free of $Nb_2O_5$ and $Ta_2O_5$ (i.e., the comparative glass is made and heat-treated the same manner as the glass comprising the $Al_2O_3$, REO, at least one of $ZrO_2$ or $HfO_2$, and $Nb_2O_5$ and/or $Ta_2O_5$ except no $Nb_2O_5$ or $Ta_2O_5$ was used to make the glass (i.e., such glass contains zero percent by weight $Nb_2O_5$ or $Ta_2O_5$, based on the total weight of the glass)))).

In some embodiments, the glass comprising at least 35 (in some embodiments, at least 40, 45, 50, 55, 60, 65, 70, or even at least 75; in some embodiments, in a range from 35 to 75, 40 to 75, 45 to 75, 50 to 75, 55 to 75, or even from 60 to 75) percent by weight $Al_2O_3$, based on the total weight of the glass, REO (e.g., $Gd_2O_3$, $La_2O_3$, and/or $Nd_2O_3$; in some embodiments, at least 0.5, 1, 2, 3, 4, 5, or even at least 10; in some embodiments, in a range from 0.5 to 70, 1 to 70, 5 to 70, 10 to 70, 0.5 to 50, 1 to 50, 5 to 50, 10 to 50, 0.5 to 40, 1 to 40, 5 to 40, 10 to 40, 0.5 to 30, 1 to 30, 5 to 30, 10 to 30, 0.5 to 25, 1 to 25, 5 to 25, or even from 10 to 25 percent by weight REO, based on the total weight of the glass), and $ZrO_2$ (in some embodiments, $ZrO_2$ and/or (including collectively) $HfO_2$) (in some embodiments, at least 5, 10, 15, or even at least 20; in some embodiments, in a range from 5 to 30, 5 to 25, 10 to 25, 10 to 30, 15 to 30, 20 to 30, 15 to 25, or even from 15 to 20 percent by weight $ZrO_2$ (in some embodiments, $ZrO_2$ and/or (including collectively) $HfO_2$), based on the total weight of the glass), and at least one of $Nb_2O_5$ or $Ta_2O_5$ (in some embodiments, at least 1, 2, 3, 4, 5, 10, 15, 20, or even at least 25; in some embodiments, in a range from 1 to 20, 5 to 20, 10 to 20, or even from 5 to 15 percent by weight at least one of $Nb_2O_5$ or $Ta_2O_5$, based on the total weight of the glass), wherein the glass contains not more than 10 (in some embodiments, not more than 9, 8, 7, 6, 5, 4, 3, 2, 1, 0.5, 0.1, or even zero) percent by weight collectively $As_2O_3$, $B_2O_3$, $GeO_2$, $P_2O_5$, $SiO_2$, $TeO_2$, and $V_2O_5$, based on the total weight of the glass. For additional details regarding inclusion of $Nb_2O_5$ and/or $Ta_2O_5$, see, for example, copending application having U.S. Ser. No. 10/666,615, filed Sep. 18, 2003.

In some instances, it may be preferred to incorporate limited amounts of metal oxides selected from the group consisting of: $Na_2O$, $P_2O_5$, $SiO_2$, $TeO_2$, $V_2O_3$, and combinations thereof. Sources, including commercial sources, include the oxides themselves, complex oxides, ores, carbonates, acetates, nitrates, chlorides, hydroxides, etc. These metal oxides may be added, for example, to modify a physical property of the resulting abrasive particles and/or improve processing. These metal oxides when used are typically are added from greater than 0 to 20% by weight, in some embodiments, greater than 0 to 5% by weight, or even greater than 0 to 2% by weight of the glass-ceramic depending, for example, upon the desired property.

For glasses that devitrify to form glass-ceramics, crystallization may also be affected by the additions of materials beyond those needed for the general composition. For example, certain metals, metal oxides (e.g., titanates and zirconates), and fluorides, for example, may act as nucleation agents resulting in beneficial heterogeneous nucleation of crystals. Also, addition of some oxides may change nature of metastable phases devitrifying from the glass upon reheating. In another aspect, for ceramics according to the present invention comprising crystalline $ZrO_2$, it may be desirable to add metal oxides (e.g., $Y_2O_3$, $TiO_2$, CaO, and MgO) that are known to stabilize tetragonal/cubic form of $ZrO_2$.

In some embodiments, it may be advantageous for at least a portion of a metal oxide source (in some embodiments, 10, 15, 20, 25, 30, 35, 40, 45, 50, 55, 60, 65, 70, 75, 80, 85, 90, or even at least 95 percent by weight) to be obtained by adding particulate, metallic material comprising at least one of a metal (e.g., Al, Ca, Cu, Cr, Fe, Li, Mg, Ni, Ag, Ti, Zr, and combinations thereof), M, that has a negative enthalpy of oxide formation or an alloy thereof to the melt, or otherwise metal them with the other raw materials. Although not wanting to be bound by theory, it is believed that the heat resulting from the exothermic reaction associated with the oxidation of the metal is beneficial in the formation of a homogeneous melt and resulting glass. For example, it is believed that the additional heat generated by the oxidation reaction within the raw material eliminates, minimizes, or at least reduces insufficient heat transfer, and hence facilitates formation and homogeneity of the melt, particularly when forming glass particles with x, y, and z dimensions over 150 micrometers. It is also believed that the availability of the additional heat aids in driving various chemical reactions and physical processes (e.g., densification, and spherodization) to completion. Further, it is believed for some embodiments, the presence of the additional heat generated by the oxidation reaction actually enables the formation of a melt, which otherwise is difficult or not practical due to high melting point of the materials. Further, the presence of the additional heat generated by the oxidation reaction actually enables the formation of glass that otherwise could not be made, or could not be made in the desired size range.

Embodiments of glass useful for practicing the present invention can be made, for example, by melting the metal oxide sources in any suitable furnace (e.g., an inductive heated furnace, a gas-fired furnace, or an electrical furnace), or, for example, in a plasma. The resulting melt is cooled (e.g., discharging the melt into a cooling media (e.g., high velocity air jets, liquids, metal plates (including chilled metal plates), metal rolls (including chilled metal rolls), metal balls (including chilled metal balls), and the like)).

Embodiments of glasses can also be obtained by other techniques, such as: laser spin melt with free fall cooling, Taylor wire technique, plasmatron technique, hammer and anvil technique, centrifugal quenching, air gun splat cooling, single roller and twin roller quenching, roller-plate quenching and pendant drop melt extraction (see, e.g., *Rapid Solidification of Ceramics*, Brockway et al., Metals And Ceramics Information Center, A Department of Defense Information Analysis Center, Columbus, Ohio, January, 1984). Embodiments of glasses may also be obtained by other techniques, such as: thermal (including flame or laser or plasma-assisted) pyrolysis of suitable precursors, physical vapor synthesis (PVS) of metal precursors and mechanochemical processing.

In one method, glass useful for the present invention can be made utilizing flame fusion as disclosed, for example, in U.S. Pat. No. 6,254,981 (Castle). In this method, the metal oxide sources materials are fed (e.g., in the form of particles, sometimes referred to as "feed particles") directly into a burner (e.g., a methane-air burner, an acetylene-oxygen burner, a hydrogen-oxygen burner, and like), and then quenched, for example, in water, cooling oil, air, or the like. Feed particles can be formed, for example, by grinding, agglomerating (e.g., spray-drying), melting, or sintering the metal oxide sources.

The size of feed particles fed into the flame generally determines the size of the resulting glass particles/beads.

The present invention can be useful, for example, to obtain ceramic articles without limitations in dimensions. This was found to be possible through a coalescence step performed at temperatures above glass transition temperature. For instance, glass useful in carrying out the present invention undergoes glass transition ($T_g$) before significant crystallization occurs ($T_x$) as evidenced by the existence of endotherm ($T_g$) at lower temperature than exotherm ($T_x$). This allows for bulk fabrication of articles of any dimensions from relatively small pieces of glass. More specifically, for example, an article made according to the present invention, can be provided by heating, for example, glass particles (including beads and microspheres), fibers, etc. useful in carrying out the present invention above the $T_g$ such that the glass particles, etc. coalesce to form a shape and cooling the coalesced shape to provide the article. In certain embodiments, heating is conducted at at least one temperature in a range of about 725° C. to about 1100° C.

For certain embodiments, coalescence may be conducted at temperatures significantly higher than crystallization temperature ($T_x$). Although not wanting to be bound by theory, it s is believed the relatively slow kinetics of crystallization allow access to higher temperatures for viscous flow. Surprisingly, I discovered coalescence is enhanced by methods according to the present invention. While not wishing to be bound by theory, it is believed that viscosity of glass decreases as the gas pressure increases causing increases in densification rates.

Heat-treatment can be carried out in any of a variety of ways, including those known in the art for heat-treating glass to convert at least a portion of the glass to crystalline ceramic and provide glass-ceramics. For example, heat-treatment can be conducted in batches, for example, using resistive, inductively or gas heated furnaces. Alternatively, for example, heat-treatment can be conducted continuously, for example, using rotary kilns. In the case of a rotary kiln, the material can be fed, for example, directly into a kiln operating at the elevated temperature. The time at the elevated temperature may range from a few seconds (in some embodiments, even less than 5 seconds) to a few minutes to several hours. The temperature may range anywhere from 900° C. to 1600° C., typically between 1200° C. to 1500° C. It is also within the scope of the present invention to perform some of the heat-treatment in batches (e.g., for the nucleation step) and another continuously (e.g., for the crystal growth step and to achieve the desired density). For the nucleation step, the temperature typically ranges between about 900° C. to about 1100° C., in some embodiments, in a range from about 925° C. to about 1050° C. Likewise for the density step, the temperature typically is in a range from about 1100° C. to about 1600° C., in some embodiments, in a range from about 1200° C. to about 1500° C. This heat treatment may occur, for example, by feeding the material directly into a furnace at the elevated temperature. Alternatively, for example, the material may be feed into a furnace at a much lower temperature (e.g., room temperature) and then heated to desired temperature at a predetermined heating rate. It is within the scope of the present invention to conduct heat-treatment in an atmosphere other than air. In some cases it might be even desirable to heat-treat in a reducing atmosphere(s). Also, for, example, it may be desirable to heat-treat under gas pressure as in, for example, hot-isostatic press, or in gas pressure furnace.

The particular selection of metal oxide sources and other additives for making ceramics according to the present invention typically takes into account, for example, the desired composition and microstructure of the resulting ceramics, the desired degree of crystallinity, if any, the desired physical properties (e.g., hardness or toughness) of the resulting ceramics, avoiding or minimizing the presence of undesirable impurities, the desired characteristics of the resulting ceramics, and/or the particular process (including equipment and any purification of the raw materials before and/or during fusion and/or solidification) being used to prepare the ceramics.

The metal oxide sources and other additives can be in any form suitable to the process and equipment utilized for the present invention. The raw materials can be melted and quenched using techniques and equipment known in the art for making oxide glasses and amorphous metals. Desirable cooling rates include those of 50K/s and greater. Cooling techniques known in the art include roll-chilling. Roll-chilling can be carried out, for example, by melting the metal oxide sources at a temperature typically 20-200° C. higher than the melting point, and cooling/quenching the melt by spraying it under high pressure (e.g., using a gas such as air, argon, nitrogen or the like) onto a high-speed rotary roll(s). Typically, the rolls are made of metal and are water cooled. Metal book molds may also be useful for cooling/quenching the melt.

Other techniques for forming melts, cooling/quenching melts, and/or otherwise forming glass include vapor phase quenching, plasma spraying, melt-extraction, and gas atomization. Vapor phase quenching can be carried out, for example, by sputtering, wherein the metal alloys or metal oxide sources are formed into a sputtering target(s) which are used. The target is fixed at a predetermined position in a sputtering apparatus, and a substrate(s) to be coated is placed at a position opposing the target(s). Typical pressures of $10^{-3}$ torr of oxygen gas and Ar gas, discharge is generated between the target(s) and a substrate(s), and Ar or oxygen ions collide against the target to start reaction sputtering, thereby depositing a film of composition on the substrate. For additional details regarding plasma spraying, see, for example, copending application having U.S. Ser. No. 10/211,640, filed Aug. 2, 2002.

Gas atomization involves melting feed particles to convert them to melt. A thin stream of such melt is atomized through contact with a disruptive air jet (i.e., the stream is divided into fine droplets). The resulting substantially discrete, generally ellipsoidal glass particles are then recovered. Melt-extraction can be carried out, for example, as disclosed in U.S. Pat. No. 5,605,870 (Strom-Olsen et al.). Container-less glass forming techniques utilizing laser beam heating as disclosed, for example, in PCT application having Publication No. WO 01/27046 A1, published Apr. 4, 2001, may also be useful in making glass according to the present invention.

The cooling rate is believed to affect the properties of the quenched glass. For instance, glass transition temperature, density and other properties of glass typically change with cooling rates.

Rapid cooling may also be conducted under controlled atmospheres, such as a reducing, neutral, or oxidizing environment to maintain and/or influence the desired oxidation states, etc. during cooling. The atmosphere can also influence glass formation by influencing crystallization kinetics from undercooled liquid. For example, larger undercooling of $Al_2O_3$ melts without crystallization has been reported in argon atmosphere as compared to that in air.

With regard to making particles, for example, the resulting ceramic (e.g., glass or ceramic comprising glass may be larger in size than that desired. The ceramic can be, and typically is, converted into smaller pieces using crushing and/or comminuting techniques known in the art, including roll crushing, canary milling, jaw crushing, hammer milling, ball milling, jet milling, impact crushing, and the like. In some instances, it is desired to have two or multiple crushing steps. For example, after the ceramic is formed (solidified), it may be in the form larger than desired. The first crushing step may involve crushing these relatively large masses or "chunks" to form smaller pieces. This crushing of these chunks may be accomplished with a hammer mill, impact crusher or jaw crusher. These smaller pieces may then be subsequently crushed to produce the desired particle size distribution. In order to produce the desired particle size distribution (sometimes referred to as grit size or grade), it may be necessary to perform multiple crushing steps. In general the crushing conditions are optimized to achieve the desired particle shape(s) and particle size distribution.

The shape of particles can depend, for example, on the composition of the glass, the geometry in which it was cooled, and the manner in which the glass is crushed (i.e., the crushing technique used), if the particles were formed by crushing.

Certain articles according to the present invention comprising glass can be heat-treated to increase or at least partially crystallize the glass to provide glass-ceramic. The heat-treatment of certain glasses to form glass-ceramics is well known in the art. The heating conditions to nucleate and grow glass-ceramics are known for a variety of glasses. Alternatively, one skilled in the art can determine the appropriate conditions from a Time-Temperature-Transformation (TTT) study of the glass using techniques known in the art. One skilled in the art, after reading the disclosure of the present invention should be able to provide TTT curves for glasses according to the present invention, determine the appropriate nucleation and/or crystal growth conditions to provide crystalline ceramics, glass-ceramics, and ceramic comprising glass according to the present invention.

Typically, glass-ceramics are stronger than the glasses from which they are formed. Hence, the strength of the material may be adjusted, for example, by the degree to which the glass is converted to crystalline ceramic phase(s). Alternatively, or in addition, the strength of the material may also be affected, for example, by the number of nucleation sites created, which may in turn be used to affect the number, and in turn the size of the crystals of the crystalline phase(s). For additional details regarding forming glass-ceramics, see, for example, *Glass-Ceramics*, P. W. McMillan, Academic Press, Inc., $2^{nd}$ edition, 1979.

For example, during heat-treatment of a glass such as a glass comprising $Al_2O_3$, $La_2O_3$, and $ZrO_2$ formation of phases such as $La_2Zr_2O_7$, and, if $ZrO_2$ is present, cubic/tetragonal $ZrO_2$, in some cases monoclinic $ZrO_2$, have been observed at temperatures above about 900° C. Although not wanting to be bound by theory, it is believed that zirconia-related phases are the first phases to nucleate from the glass. For example, of $Al_2O_3$, $ReAlO_3$ (wherein Re is at least one rare earth cation), $ReAl_{11}O_{18}$, $Re_3Al_5O_{12}$, $Y_3Al_5O_{12}$, etc. phases are believed to generally occur at temperatures above about 925° C. Crystallite size during this nucleation step may be on the order of nanometers. For example, crystals as small as 10-15 nanometers have been observed. Longer heat-treating temperatures typically lead to the growth of crystallites and progression of crystallization. For at least some embodiments, heat-treatment at about 1300° C. for about 1 hour provides a full crystallization.

Certain ceramic articles made according to the present invention contain less than less than 20% by weight $SiO_2$ (or even less than 15%, less than 10%, less than, 5% by weight, or even zero percent, by weight, $SiO_2$), less than 20% by weight $B_2O_3$ (or even less than 15%, less than 10%, less than, 5% by weight, or even zero percent, by weight, $B_2O_3$), and less than 40% by weight $P_2O_5$ (or even less than 35%, less than 30%, less than 25%, less than 20%, less than 15%, less than 10%, less than, 5% by weight, or even zero percent, by weight, $P_2O_5$), based on the total metal oxide weight of the ceramic.

The microstructure or phase composition (glassy/crystalline) of a material can be determined in a number of ways. Various information can be obtained using optical microscopy, electron microscopy, differential thermal analysis (DTA), and x-ray diffraction (XRD), for example.

Using optical microscopy, glass is typically predominantly transparent due to the lack of light scattering centers such as crystal boundaries, while crystalline material shows a crystalline structure and is opaque due to light scattering effects.

Using DTA, the material is classified as amorphous if the corresponding DTA trace of the material contains an exothermic crystallization event ($T_x$). If the same trace also contains an endothermic event ($T_g$) at a temperature lower than $T_x$ it is considered to consist of a glass phase. If the DTA trace of the material contains no such events, it is considered to contain crystalline phases.

Differential thermal analysis (DTA) can be conducted using the following method. DTA runs can be made (using an instrument such as that obtained from Netzsch Instruments, Selb, Germany under the trade designation "NETZSCH STA 409 DTA/TGA") using a −140+170 mesh size fraction (i.e., the fraction collected between 105-micrometer opening size and 90-micrometer opening size screens). An amount of each screened sample (typically about 400 milligrams (mg)) is placed in a 100-microliter $Al_2O_3$ sample holder. Each sample is heated in static air at a rate of 10° C./minute from room temperature (about 25° C.) to 1100° C.

Using powder x-ray diffraction, XRD, (using an x-ray diffractometer such as that obtained under the trade designation "PHILLIPS XRG 3100" from Phillips, Mahwah, N.J., with copper K α1 radiation of 1.54050 Angstrom) the phases present in a material can be determined by comparing the peaks present in the XRD trace of the crystallized material to XRD patterns of crystalline phases provided in JCPDS (Joint Committee on Powder Diffraction Standards) databases, published by International Center for Diffraction Data. Furthermore, an XRD can be used qualitatively to determine types of phases. The presence of a broad diffused intensity peak is taken as an indication of the amorphous nature of a material. The existence of both a broad peak and well-defined peaks is taken as an indication of existence of crystalline matter within an amorphous matrix. The initially formed glass or ceramic (including glass prior to crystallization) may be larger in size than that desired. The glass or ceramic can be converted into smaller pieces using crushing and/or comminuting techniques known in the art, including roll crushing, canary milling, jaw crushing, hammer milling, ball milling, jet milling, impact crushing, and the like. In some instances, it is desired to have two or multiple crushing steps. For example, after the ceramic is formed (solidified), it may be in the form of larger than desired. The first crushing step may involve crushing these relatively large masses or "chunks" to form smaller pieces. This crushing of these chunks may be accomplished with a hammer mill, impact crusher or jaw crusher. These smaller pieces may then be subsequently crushed to produce the desired particle size distribution. In order to produce the desired particle size distribution (sometimes referred to as grit size or grade), it may be necessary to perform multiple crushing steps. In general the crushing conditions are optimized to achieve the desired particle shape(s) and particle size distribution. Resulting particles that are of the desired size may be recrushed if they are too large, or "recycled" and used as a raw material for re-melting if they are too small.

The shape of particles can depend, for example, on the composition and/or microstructure of the ceramic, the geometry in which it was cooled, and the manner in which the ceramic is crushed (i.e., the crushing technique used). In general, where a "blocky" shape is preferred, more energy may be employed to achieve this shape. Conversely, where a "sharp" shape is preferred, less energy may be employed to achieve this shape. The crushing technique may also be changed to achieve different desired shapes. For some particles an average aspect ratio ranging from 1:1 to 5:1 is typically desired, and in some embodiments, 1.25:1 to 3:1, or even 1.5:1 to 2.5:1.

Ceramic articles (including glass-ceramics) made according to the present invention may comprise at least 1, 2, 3, 5, 10, 15, 20, 25, 30, 35, 40, 45, 50, 55, 60, 65, 70, 75, 80, 85, 90, 95, 97, 98, 99, or even 100 percent by volume crystallites, wherein the crystallites have an average size of less than 1 micrometer. In another aspect, ceramic articles (including glass-ceramics) made according to the present invention may comprise less than at least 1, 2, 3, 5, 10, 15, 20, 25, 30, 35, 40, 45, 50, 55, 60, 65, 70, 75, 80, 85, 90, 95, 97, 98, 99, or even 100 percent by volume crystallites, wherein the crystallites have an average size of less than 0.5 micrometer. In another aspect, ceramics (including glass-ceramics) according to the present invention comprise less than at least 1, 2, 3, 5, 10, 15, 20, 25, 30, 35, 40, 45, 50, 55, 60, 65, 70, 75, 80, 85, 90, 95, 97, 98, 99, or even 100 percent by volume crystallites, wherein the crystallites have an average size of less than 0.3 micrometer. In another aspect, ceramic articles (including glass-ceramics) made according to the present invention may comprise less than at least 1, 2, 3, 5, 10, 15, 20, 25, 30, 35, 40, 45, 50, 55, 60, 65, 70, 75, 80, 85, 90, 95, 97, 98, 99, or even 100 percent by volume crystallites, wherein the crystallites have an average size of less than 0.15 micrometer. In another aspect, ceramic articles (including glass-ceramics) made according to the present invention may be free of at least one of eutectic microstructure features (i.e., is free of colonies and lamellar structure) or a non-cellular microstructure.

In another aspect, certain ceramic articles made according to the present invention may comprise, for example, at least 1, 2, 3, 5, 10, 15, 20, 25, 30, 35, 40, 45, 50, 55, 60, 65, 70, 75, 80, 85, 90, 95, or even 100 percent by volume glass. In another aspect, certain ceramic articles made according to the present invention may comprise, for example, 100 or at least 1, 2, 3, 5, 10, 15, 20, 25, 30, 35, 40, 45, 50, 55, 60, 65, 70, 75, 80, 85, 90, 95, 97, 98, 99, or even 100 percent by volume crystalline ceramic.

Certain articles made according to the present invention comprise glass comprising REO and $Al_2O_3$, wherein at least 80 (85, 90, 95, 97, 98, 99, or even 100) percent by weight of the glass collectively comprises the REO and $Al_2O_3$, based on the total weight of the glass.

In another aspect, certain articles made according to the present invention provides a ceramic comprising glass (e.g., at least 5, 10, 15, 20, 25, 30, 35, 40, 45, 50, 55, 60, 65, 70, 75, 80, 85, 90, 95, 97, 98, 99, or even 100 percent by volume glass), the glass comprising REO and $Al_2O_3$, wherein at least 80 (85, 90, 95, 97, 98, 99, or even 100) percent by weight of the glass collectively comprises the REO and $Al_2O_3$, based on the total weight of the glass.

In another aspect, certain articles made according to the present invention provides glass-ceramic comprising REO and $Al_2O_3$, wherein at least 80 (85, 90, 95, 97, 98, 99, or even 100) percent by weight of the glass-ceramic collectively comprises the REO and $Al_2O_3$, based on the total weight of the glass-ceramic. The glass-ceramic may comprise, for example, at least 1, 2, 3, 5, 10, 15, 20, 25, 30, 35, 40, 45, 50, 55, 60, 65, 70, 75, 80, 85, 90, or 95 percent by volume glass. The glass-ceramic may comprise, for example, at least 99, 98, 97, 95, 90, 85, 80, 75, 70, 65, 60, 55, 50, 45, 40, 35, 30, 25, 20, 15, 10, or 5 percent by volume crystalline ceramic.

In another aspect, the present invention provides glass-ceramic comprising REO and $Al_2O_3$, wherein, for example, glass-ceramic exhibits a microstructure comprising crystallites having an average crystallite size of less than 1 micrometer (typically, less than 500 nanometers, even less than 300, 200, or 150 nanometers; and in some embodiments, less than 100, 75, 50, 25, or 20 nanometers), and (b) is free of at least one of eutectic microstructure features or a non-cellular microstructure. The glass-ceramic may comprise, for example, at least 1, 2, 3, 5, 10, 15, 20, 25, 30, 35, 40, 45, 50, 55, 60, 65, 70, 75, 80, 85, 90, 95, percent by volume glass. The glass-ceramic may comprise, for example, at least 99, 98, 97, 95, 90, 85, 80, 75, 70, 65, 60, 55, 50, 45, 40, 35, 30, 25, 20, 15, 10, or 5 percent by volume crystalline ceramic.

In another aspect, certain articles made according to the present invention provides a ceramic comprising crystalline ceramic (e.g., at least 1, 2, 3, 5, 10, 15, 20, 25, 30, 35, 40, 45, 50, 55, 60, 65, 70, 75, 80, 85, 90, 95, 97, 98, 99, or even 100 percent by volume crystalline ceramic), the crystalline ceramic comprising, wherein at least 80 (85, 90, 95, 97, 98, 99, or even 100) percent by weight of the crystalline ceramic collectively comprises the REO and $Al_2O_3$, based on the total weight of the crystalline ceramic. The ceramic may comprise, for example, at least 99, 98, 97, 95, 90, 85, 80, 75, 70, 65, 60, 55, 50, 45, 40, 35, 30, 25, 20, 15, 10, 5, 3, 2, or 1 percent by volume glass.

In another aspect, certain articles made according to the present invention provides a ceramic comprising crystalline ceramic (e.g., at least 1, 2, 3, 5, 10, 15, 20, 25, 30, 35, 40, 45, 50, 55, 60, 65, 70, 75, 80, 85, 90, 95, 97, 98, 99, or even 100 percent by volume crystalline ceramic), the ceramic comprising REO and $Al_2O_3$, wherein at least 80 (85, 90, 95, 97, 98, 99, or even 100) percent by weight of the ceramic collectively comprises REO and $Al_2O_3$, based on the total weight of the ceramic. The ceramic may comprise, for example, at least 99, 98, 97, 95, 90, 85, 80, 75, 70, 65, 60, 55, 50, 45, 40, 35, 30, 25, 20, 15, 10, 5, 3, 2, or 1 percent by volume glass.

Certain articles made according to the present invention comprise glass comprising REO and $Al_2O_3$, wherein at least 80 (85, 90, 95, 97, 98, 99, or even 100) percent by weight of the glass collectively comprises the REO and $Al_2O_3$, based on the total weight of the glass.

In another aspect, certain articles made according to the present invention provides a ceramic comprising glass (e.g., at least 5, 10, 15, 20, 25, 30, 35, 40, 45, 50, 55, 60, 65, 70, 75, 80, 85, 90, 95, 97, 98, 99, or even 100 percent by volume glass), the glass comprising REO, $Al_2O_3$, and $ZrO_2$, wherein at least 80 (85, 90, 95, 97, 98, 99, or even 100) percent by weight of the glass collectively comprises the REO and $Al_2O_3$ and $ZrO_2$, based on the total weight of the glass.

In another aspect, certain articles made according to the present invention provides glass-ceramic comprising REO, $Al_2O_3$, and $ZrO_2$, wherein at least 80 (85, 90, 95, 97, 98, 99, or even 100) percent by weight of the glass-ceramic collectively comprises the REO and $Al_2O_3$ and $ZrO_2$, based on the total weight of the glass-ceramic. The glass-ceramic may comprise, for example, at least 1, 2, 3, 5, 10, 15, 20, 25, 30, 35, 40, 45, 50, 55, 60, 65, 70, 75, 80, 85, 90, or 95 percent by volume glass. The glass-ceramic may comprise, for example, at least 99, 98, 97, 95, 90, 85, 80, 75, 70, 65, 60, 55, 50, 45, 40, 35, 30, 25, 20, 15, 10, or 5 percent by volume crystalline ceramic.

In another aspect, the present invention provides glass-ceramic comprising REO, $Al_2O_3$, and $ZrO_2$, wherein the glass-ceramic (a) exhibits a microstructure comprising crystallites having an average crystallite size of less than 1 micrometer (typically, less than 500 nanometers, even less than 300, 200, or 150 nanometers; and in some embodiments, less than 100, 75, 50, 25, or 20 nanometers), and (b) is free of at least one of eutectic microstructure features or a non-cellular microstructure. The glass-ceramic may comprise, for example, at least 1, 2, 3, 5, 10, 15, 20, 25, 30, 35, 40, 45, 50, 55, 60, 65, 70, 75, 80, 85, 90, 95, percent by volume glass. The glass-ceramic may comprise, for example, at least 99, 98, 97, 95, 90, 85, 80, 75, 70, 65, 60, 55, 50, 45, 40, 35, 30, 25, 20, 15, 10, or 5 percent by volume crystalline ceramic.

In another aspect, certain articles made according to the present invention provides a ceramic comprising crystalline ceramic (e.g., at least 1, 2, 3, 5, 10, 15, 20, 25, 30, 35, 40, 45, 50, 55, 60, 65, 70, 75, 80, 85, 90, 95, 97, 98, 99, or even 100 percent by volume crystalline ceramic), the crystalline ceramic comprising, wherein at least 80 (85, 90, 95, 97, 98, 99, or even 100) percent by weight of the crystalline ceramic collectively comprises the REO, $Al_2O_3$, and $ZrO_2$, based on the total weight of the crystalline ceramic. The ceramic may comprise, for example, at least 99, 98, 97, 95, 90, 85, 80, 75, 70, 65, 60, 55, 50, 45, 40, 35, 30, 25, 20, 15, 10, 5, 3, 2, or 1 percent by volume glass.

In another aspect, certain articles made according to the present invention provides a ceramic comprising crystalline ceramic (e.g., at least 1, 2, 3, 5, 10, 15, 20, 25, 30, 35, 40, 45, 50, 55, 60, 65, 70, 75, 80, 85, 90, 95, 97, 98, 99, or even 100 percent by volume crystalline ceramic), the ceramic comprising REO and $Al_2O_3$ and $ZrO_2$, wherein at least 80 (85, 90, 95, 97, 98, 99, or even 100) percent by weight of the ceramic collectively comprises REO, $Al_2O_3$, and $ZrO_2$, based on the total weight of the ceramic. The ceramic may comprise, for example, at least 99, 98, 97, 95, 90, 85, 80, 75, 70, 65, 60, 55, 50, 45, 40, 35, 30, 25, 20, 15, 10, 5, 3, 2, or 1 percent by volume glass.

In another aspect, certain articles made according to the present invention provides a ceramic comprising glass (e.g., at least 5, 10, 15, 20, 25, 30, 35, 40, 45, 50, 55, 60, 65, 70, 75, 80, 85, 90, 95, 97, 98, 99, or even 100 percent by volume glass), the glass comprising REO, $Al_2O_3$, $ZrO_2$, and $SiO_2$ wherein at least 80 (85, 90, 95, 97, 98, 99, or even 100) percent by weight of the glass collectively comprises the REO and $Al_2O_3$ and $ZrO_2$, based on the total weight of the glass.

In another aspect, certain articles made according to the present invention provides glass-ceramic comprising REO, $Al_2O_3$, $ZrO_2$, and $SiO_2$, wherein at least 80 (85, 90, 95, 97, 98, 99, or even 100) percent by weight of the glass-ceramic collectively comprises the REO and $Al_2O_3$ and $ZrO_2$, based on the total weight of the glass-ceramic. The glass-ceramic may comprise, for example, at least 1, 2, 3, 5, 10, 15, 20, 25, 30, 35, 40, 45, 50, 55, 60, 65, 70, 75, 80, 85, 90, or 95 percent by volume glass. The glass-ceramic may comprise, for example, at least 99, 98, 97, 95, 90, 85, 80, 75, 70, 65, 60, 55, 50, 45, 40, 35, 30, 25, 20, 15, 10, or 5 percent by volume crystalline ceramic.

In another aspect, the present invention provides glass-ceramic comprising REO, $Al_2O_3$, $ZrO_2$, and $SiO_2$, wherein the glass-ceramic (a) exhibits a microstructure comprising crystallites having an average crystallite size of less than 1 micrometer (typically, less than 500 nanometers, even less than 300, 200, or 150 nanometers; and in some embodiments, less than 100, 75, 50, 25, or 20 nanometers), and (b) is free of at least one of eutectic microstructure features or a non-cellular microstructure. The glass-ceramic may comprise, for example, at least 1, 2, 3, 5, 10, 15, 20, 25, 30, 35, 40, 45, 50, 55, 60, 65, 70, 75, 80, 85, 90, 95, percent by volume glass. The glass-ceramic may comprise, for example, at least 99, 98, 97, 95, 90, 85, 80, 75, 70, 65, 60, 55, 50, 45, 40, 35, 30, 25, 20, 15, 10, or 5 percent by volume crystalline ceramic.

In another aspect, certain articles made according to the present invention provides a ceramic comprising crystalline ceramic (e.g., at least 1, 2, 3, 5, 10, 15, 20, 25, 30, 35, 40, 45, 50, 55, 60, 65, 70, 75, 80, 85, 90, 95, 97, 98, 99, or even 100 percent by volume crystalline ceramic), the crystalline ceramic comprising, wherein at least 80 (85, 90, 95, 97, 98, 99, or even 100) percent by weight of the crystalline ceramic collectively comprises the REO, $Al_2O_3$, $ZrO_2$, and $SiO_2$, based on the total weight of the crystalline ceramic. The ceramic may comprise, for example, at least 99, 98, 97, 95, 90, 85, 80, 75, 70, 65, 60, 55, 50, 45, 40, 35, 30, 25, 20, 15, 10, 5, 3, 2, or 1 percent by volume glass.

In another aspect, certain articles made according to the present invention provides a ceramic comprising crystalline ceramic (e.g., at least 1, 2, 3, 5, 10, 15, 20, 25, 30, 35, 40, 45, 50, 55, 60, 65, 70, 75, 80, 85, 90, 95, 97, 98, 99, or even 100 percent by volume crystalline ceramic), the ceramic comprising REO and $Al_2O_3$ and $ZrO_2$, wherein at least 80 (85, 90, 95, 97, 98, 99, or even 100) percent by weight of the ceramic collectively comprises REO, $Al_2O_3$, $ZrO_2$, and $SiO_2$, based on the total weight of the ceramic. The ceramic may comprise, for example, at least 99, 98, 97, 95, 90, 85, 80, 75, 70, 65, 60, 55, 50, 45, 40, 35, 30, 25, 20, 15, 10, 5, 3, 2, or 1 percent by volume glass.

Crystalline phases that may be present in ceramics according to the present invention include alumina (e.g., alpha and transition aluminas), BaO, CaO, $Cr_2O_3$, CoO, $Fe_2O_3$, $GeO_2$, $HfO_2$, $Li_2O$, MgO, MnO, NiO, $Na_2O$, $P_2O_5$, REO, $Sc_2O_3$, $SiO_2$, SrO, $TeO_2$, $TiO_2$, $V_2O_3$, $Y_2O_3$, ZnO, $ZrO_2$, "complex metal oxides" (including "complex $Al_2O_3$.metal oxide" (e.g., complex $Al_2O_3$.REO)), and combinations thereof.

Additional details regarding ceramics comprising $Al_2O_3$, at least one of REO or $Y_2O_3$, and at least one of $ZrO_2$ or $HfO_2$, including making, using, and properties, can be found in application having U.S. Ser. Nos. 09/922,527, 09/922,528, and 09/922,530, filed Aug. 2, 2001, and U.S. Ser. Nos. 10/211,629, 10/211,598, 10/211,630, 10/211,639, 10/211,034, 10/211,044, 10/211,628, 10/211,640, and 10/211,684, filed Aug. 2, 2002.

Typically, and desirably, the (true) density, sometimes referred to as specific gravity, of ceramic according to the present invention is typically at least 70% of theoretical density. More desirably, the (true) density of ceramic according to the present invention is at least 75%, 80%, 85%, 90%, 95%, 96%, 97%, 98%, 99%, 99.5%, or 100% of theoretical density.

Examples of articles according of the present invention include kitchenware (e.g., plates), dental restorative materials, orthodontic brackets, ophthalmic lenses and other optical elements, IR-transmitting windows and coatings, reinforcing fibers, cutting tool inserts, abrasive materials, and structural components of gas engines, (e.g., valves and bearings). Other articles include those having a protective coating of ceramic on the outer surface of a body or other substrate. Further, for example, ceramic according to the present invention can be used as a matrix material. For example, ceramics according to the present invention can be used as a binder for ceramic materials and the like such as diamond, cubic-BN, $Al_2O_3$, $ZrO_2$, $Si_3N_4$, and SiC. Glasses or glass-ceramics made according to present invention may also used as packaging for electronics and immobilizers of a nuclear waste. Examples of useful articles comprising such materials include composite substrate coatings, cutting tool inserts abrasive agglomerates, and bonded abrasive articles such as vitrified wheels. The use of ceramics according to the present invention can be used as binders may, for example, increase the modulus, heat resistance, wear resistance, and/or strength of the composite article.

Advantages and embodiments of this invention are further illustrated by the following non-limiting examples, but the particular materials and amounts thereof recited in these examples, as well as other conditions and details, should not be construed to unduly limit this invention. All parts and percentages are by weight unless otherwise indicated. Unless otherwise stated, all examples contained no significant amount of $SiO_2$, $B_2O_3$, $P_2O_5$, $GeO_2$, $TeO_2$, $As_2O_3$, and $V_2O_5$.

EXAMPLES

Examples 1-3

A polyethylene bottle was charged with 38.75 grams of alumina particles (obtained under the trade designation "APA-0.5" from Condea Vista, Tucson, Ariz.), 42.5 grams of lanthanum oxide particles (obtained from Molycorp, Inc., Mountain Pass, Calif.), 18.75 grams of yttria-stabilized zirconium oxide particles (obtained from Zirconia Sales, Inc. of Marietta, Ga. under the trade designation "HSY-3") and 180 grams of DI water. About 200 grams of zirconia milling media (obtained from Tosoh Ceramics, Division of Bound Brook, N.J., under the trade designation "YTZ") were added to the bottle, and the mixture was milled at 120 revolutions per minute (rpm) for 24 hours. After the milling, the milling media were removed and the slurry poured onto a glass ("PYREX") pan where it was dried using a heat-gun. The resulting dried mixture was ground with a mortar and pestle and screened through a 70-mesh screen (212-micrometer opening size).

After grinding and screening, some of the –70 mesh screen particles were fed into a hydrogen/oxygen torch flame. The torch used to melt the particles, thereby generating melted glass beads, was a Bethlehem bench burner PM2D model B, obtained from Bethlehem Apparatus Co., Hellertown, Pa., delivering hydrogen and oxygen at the following rates. For the inner ring, the hydrogen flow rate was 8 standard liters per minute (SLPM) and the oxygen flow rate was 3 SLPM. For the outer ring, the hydrogen flow rate was 23 (SLPM) and the oxygen flow rate was 9.8 SLPM. The dried and sized particles were fed directly into the torch flame, where they were melted and transported to an inclined stainless steel surface (approximately 51 centimeters (cm) (20 inches) wide with the slope angle of 45 degrees) with cold water running over (approximately 8 liters/minute) the surface to form beads.

Examples 2 and 3 beads were prepared as described in Example 1, except the raw materials and the amounts of raw materials used are listed in Table 1, below. The sources of the raw materials used are listed in Table 2, below.

TABLE 1

| Example | Weight percent of components | Batch amounts, g |
|---|---|---|
| 2 | $Gd_2O_3$: 45.32<br>$Al_2O_3$: 42.68<br>$ZrO_2$: 12 | $Gd_2O_3$: 22.66<br>$Al_2O_3$: 21.34<br>$ZrO_2$: 6 |
| 3 | $La_2O_3$: 48.12<br>$Al_2O_3$: 51.88 | $La_2O_3$: 24.06<br>$Al_2O_3$: 25.94 |

TABLE 2

| Raw Material | Source |
|---|---|
| Alumina particles ($Al_2O_3$) | Obtained from Condea Vista, Tucson, AZ under the trade designation "APA-0.5" |
| Gadolinium oxide particles ($Gd_2O_3$) | Obtained from Molycorp, Inc. |

Various properties/characteristics of some of Examples 1-3 materials were measured as follows. Powder X-ray diffraction (using an X-ray diffractometer (obtained under the trade designation "PHILLIPS XRG 3100" from PHILLIPS, Mahwah, N.J.) with copper K α1 radiation of 1.54050 Angstrom) was used to qualitatively measure phases present in example materials. The presence of a broad diffused intensity peak was taken as an indication of the amorphous nature of a material. The existence of both a broad peak and well-defined peaks was taken as an indication of existence of crystalline matter within an amorphous matrix. Phases detected in various examples are reported in Table 3, below.

TABLE 3

| Example | Phases detected via X-ray diffraction | Color | $T_g$, °C. | $T_x$, °C. | Hot-pressing temp, °C. |
|---|---|---|---|---|---|
| 1 | Amorphous* | Clear | 843 | 944 | 935 |
| 2 | Amorphous* | Clear | 862 | 932 | 935 |
| 3 | Amorphous* | Clear | 842 | 946 | 935 |

*glass, as the material has a $T_g$

For differential thermal analysis (DTA), a material was screened to retain glass beads within the 90-125 micrometer size range. DTA runs were made (using an instrument obtained from Netzsch Instruments, Selb, Germany under the trade designation "NETZSCH STA 409 DTA/TGA"). The amount of each screened sample placed in a 100-microliter $Al_2O_3$ sample holder was 400 milligrams. Each sample was heated in static air at a rate of 10° C./minute from room temperature (about 25° C.) to 1200° C. The glass transition temperatures ($T_g$) and crystallization transition temperatures ($T_x$) are reported in Table 3, above.

Examples 4-6 and Comparative Examples A-C

For each of Examples 4-6 and Comparative Examples A-C, about 4 grams of the glass beads of Examples 1-3, respectively, were placed in a graphite die and hot-pressed using uniaxial pressing apparatus (obtained under the trade designation "HP-50", Thermal Technology Inc., Brea, Calif.). The hot-pressing was carried out in an nitrogen atmosphere and 48.3 megapascals (MPa) (7000 pounds per square inch (7 ksi)) pressure at 915° C. During hot-pressing of the Examples 4-6 glass beads, nitrogen was introduced at a pressure of 68.9 kPa (10 psi). The densification of the glass beads was monitored by the displacement control unit of the hot pressing equipment. Densification rates were correspondingly derived from slopes on densification-time plot.

Comparative Examples A-C were made as described for Examples 4-6, respectively, except in the atmosphere of flowing nitrogen (i.e., no overpressure). The relative densification rates for Examples 4-6 were determined dividing the Examples 4-6 densification rates by the Comparative Examples A-C densification rates, respectively. The results are reported in Table 4, below.

TABLE 4

| Example | Comp. Ex | Densification rate ratio |
|---|---|---|
| 4 | A | 1.6 |
| 5 | B | 1.8 |
| 6 | C | 1.7 |

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A method of making an article, the method comprising:
providing a substrate having an outer surface;
providing at least a glass having an outer surface, wherein the glass comprises at least two different metal oxides, wherein the glass has a $T_g$ and $T_x$, and wherein the difference between the $T_g$ and the $T_x$ of the glass is at least 5K, the first glass comprising one of a REO-$Al_2O_3$—$ZrO_2$, $Y_2O_3$—$Al_2O_3$—$ZrO_2$, REO-$Al_2O_3$—$ZrO_2$—$SiO_2$, $Y_2O_3$—$Al_2O_3$—$ZrO_2$—$SiO_2$, REO-$Al_2O_3$, or $Y_2O_3$—$Al_2O_3$ composition, and the glass containing less than 20% by weight $SiO_2$, less than 20% by weight $B_2O_3$, and less than 40% by weight $P_2O_5$;
heating the glass above the $T_g$ such that at least a portion of the glass wets at least a portion of the outer surface of the substrate and provides an article comprising the glass attached to the at least a portion of the outer surface of the substrate, wherein the heating of the glass is conducted in a gaseous atmosphere at a pressure greater than 1.1 atm. sufficient to increase the rate of densification of the glass as compared to the same glass heated in the same manner except the pressure during the later heating is conducted in an atmosphere at a pressure of 1.0 atm., and wherein the gaseous atmosphere at a pressure greater than 1.1 atm. is in direct contact with at least a portion of the outer surface of the glass.

2. The method according to claim 1 to increased the rate of densification of the glass is by a factor of at least 1.5.

3. The method according to claim 1, wherein, the heating of the glass is conducted in an atmosphere at a pressure of at least 1.25 atm.

4. The method according to claim 3, wherein the difference between the $T_g$ and the $T_x$ is at least 25K.

5. The method according to claim 4, wherein the glass has a $T_1$, and wherein the ratio of the $T_g$ to $T_1$ is at least 0.5.

6. The method according to claim 5, wherein the glass comprises less than 40 percent by weight glass collectively $SiO_2$, $B_2O_3$, and $P_2O_5$, based on the total weight of the glass.

7. The method according to claim 6, wherein the glass is a REO-$Al_2O_3$ glass.

8. The method according to claim 7, wherein the glass collectively comprises at least 80 percent by weight of the $Al_2O_3$ and REO, based on the total weight of the glass.

9. The method according to claim 6, wherein the glass is a REO-$Al_2O_3$—$ZrO_2$ glass.

10. The method according to claim 9, wherein the glass collectively comprises at least 80 percent by weight of the $Al_2O_3$, REO, and $ZrO_2$, based on the total weight of the glass.

11. The method according to claim 3 further comprises heat-treating the glass of the article to convert at least a portion of the glass to crystalline ceramic and provide glass-ceramic.

12. The method according to claim 1, wherein, the heating of the glass is conducted in an atmosphere at a pressure of at least 2 atm.

13. A method of making an article, the method comprising:
providing a substrate having an outer surface;
providing at least a plurality of particles comprising glass, the particles comprising glass having an outer surface, wherein the glass comprises at least two different metal oxides, wherein the glass has a $T_g$ and $T_x$, and wherein the difference between the $T_g$ and the $T_x$ of the glass is at least 5K, the glass comprising REO-$Al_2O_3$—$ZrO_2$, $Y_2O_3$—$Al_2O_3$—$ZrO_2$, REO-$Al_2O_3$—$Zr_2$—$SiO_2$, $Y_2O_3$—$Al_2O_3$—$ZrO_2$—$SiO_2$, REO-$Al_2O_3$, or $Y_2O_3$—$Al_2O_3$ composition, and the glass containing less than 20% by weight $SiO_2$, less than 20% by weight $B_2O_3$, and less than 40% by weight $P_2O_5$;
heating the glass above the $T_g$ such that at least a portion of the glass of the plurality of particles wets at least a portion of the outer surface of the substrate and provides an article comprising the glass attached to the at least a portion of the outer surface of the substrate, wherein the heating of the glass is conducted in a gaseous atmosphere at a pressure greater than 1.1 atm. sufficient to increase the rate of densification of the glass as compared to the same glass heated in the same manner except the pressure during the later heating is conducted in an atmosphere at a pressure of 1.0 atm., and wherein the gaseous atmosphere at a pressure greater than 1.1 atm. is in direct contact with at least a portion of the outer surface of at least a portion the particles comprising glass.

14. The method according to claim 13 to increased the rate of densification of the glass is by a factor of at least 1.5.

15. The method according to claim 14, wherein, the heating of the glass is conducted in an atmosphere at a pressure of at least 1.25 atm.

16. The method according to claim 15, wherein the difference between the $T_g$ and the $T_x$ is at least 25K.

17. The method according to claim 16, wherein the glass has a $T_1$, and wherein the ratio of the $T_g$ to $T_1$ is at least 0.5.

18. The method according to claim 17, wherein the glass comprises less than 40 percent by weight collectively $SiO_2$, $B_2O_3$, and $P_2O_5$, based on the total weight of the glass.

19. The method according to claim 18, wherein the glass is a REO-$Al_2O_3$ glass.

20. The method according to claim 19, wherein the glass collectively comprises at least 80 percent by weight of the $Al_2O_3$ and REO, based on the total weight of the glass.

21. The method according to claim 18, wherein the glass is a REO-$Al_2O_3$—$ZrO_2$ glass.

22. The method according to claim 21, wherein the glass collectively comprises at least 80 percent by weight of the $Al_2O_3$, REO, and $ZrO_2$, based on the total weight of the glass.

23. The method according to claim 15, further comprises heat-treating the glass of the article to convert at least a portion of the glass to crystalline ceramic and provide glass-ceramic.

24. The method according to claim 13, wherein, the heating of the glass is conducted in an atmosphere at a pressure of at least 2 atm.

25. A method of making an article, the method comprising:
providing at least a first glass and second glass each having an outer surface, wherein the first glass comprises at least two different metal oxides, wherein the first glass has a $T_{g1}$ and $T_{x1}$, and wherein the difference between the $T_{g1}$ and the $T_{x1}$ is at least 5K, the first glass comprising one of a REO-$Al_2O_3$—$ZrO_2$, $Y_2O_3$—$Al_2O_3$—$ZrO_2$, REO-$Al_2O_3$—$Zr_2$—$SiO_2$, $Y_2O_3$—$Al_2O_3$—$ZrO_2$—$SiO_2$, REO-$Al_2O_3$, or $Y_2O_3$—$Al_2O_3$ composition, and the first glass containing less than 20% by weight $SiO_2$, less than 20% by weight $B_2O_3$, and less than 40% by weight $P_2O_5$;
heating the first and second glasses above at least $T_{g1}$ and at least the first glass coalescing with the second glass to provide the article, wherein the heating of at least the first and second glasses is conducted in a gaseous atmosphere at a pressure greater than 1.1 atm. sufficient to increase the rate of densification of the glass as compared to the same glass heated in the same manner except the pressure during the later heating is conducted in an atmosphere at a pressure of 1.0 atm., and wherein the gaseous atmosphere at a pressure greater than 1.1 atm. is in direct contact with at least a portion of the outer surfaces of the first and second glasses.

26. The method according to claim 25 to increased the rate of densification of the first glass is by a factor of at least 1.5.

27. The method according to claim 25, wherein, the heating of at least the first and second glasses is conducted in an atmosphere at a pressure of at least 1.25 atm.

28. The method according to claim 27, wherein the difference between the $T_{g1}$ and the $T_{x1}$ is at least 25K.

29. The method according to claim 28, wherein the first glass has a $T_1$, and wherein the ratio of the $T_{g1}$ to $T_{11}$ is at least 0.5.

30. The method according to claim 29, wherein the first glass comprises less than 40 percent by weight collectively $SiO_2$, $B_2O_3$, and $P_2O_5$, based on the total weight of the glass.

31. The method according to claim 30, wherein the first glass is a REO-$Al_2O_3$ glass.

32. The method according to claim 31, wherein the first glass collectively comprises at least 80 percent by weight of the $Al_2O_3$ and REO, based on the total weight of the glass.

33. The method according to claim 30, wherein the first glass is a REO-$Al_2O_3$—$ZrO_2$ glass.

34. The method according to claim 33, wherein the first glass collectively comprises at least 80 percent by weight of the $Al_2O_3$, REO, and $ZrO_2$, based on the total weight of the glass.

35. The method according to claim 27, further comprises heat-treating at least the first and second glasses of the article to convert at least a portion of the glass to crystalline ceramic and provide glass-ceramic.

36. The method according to claim 24, wherein, the heating of the first glass is conducted in an atmosphere at a pressure of at least 2 atm.

37. A method of making an article, the method comprising:
providing at least a first glass and second glass each having an outer surface, wherein the first glass comprises at least two different metal oxides, wherein the first glass has a $T_{g1}$ and $T_{x1}$, and wherein the difference between the $T_{g1}$ and the $T_{x1}$ is at least 5K, the first glass comprising one of a REO-$Al_2O_3$—$ZrO_2$, $Y_2O_3$—$Al_2O_3$—$ZrO_2$, REO-$Al_2O_3$—$Zr_2$—$SiO_2$, $Y_2O_3$—$Al_2O_3$—$ZrO_2$—$SiO_2$, REO-$Al_2O_3$, or $Y_2O_3$—$Al_2O_3$ composition, and the first glass containing less than 20% by weight $SiO_2$, less than 20% by weight $B_2O_3$, and less than 40% by weight $P_2O_5$, and wherein the second glass comprises at least two different metal oxides, wherein the second glass has a $T_{g2}$ and $T_{x2}$, and wherein the difference between the $T_{g2}$ and the $T_{x2}$ is at least 5K, the second glass containing less than 20% by weight $SiO_2$, less than 20% by weight $B_2O_3$, and less than 40% by weight $P_2O_5$;

heating at least the first and second glasses above the higher of $T_{g1}$ or $T_{g2}$ and coalescing the first and second glasses to provide the article, wherein the heating of at least the first and second glasses is conducted in a gaseous atmosphere at a pressure greater than 1.1 atm. sufficient to increase the rate of densification of the glass as compared to the same glasses heated in the same manner except the pressure during the later heating is conducted in an atmosphere at a pressure of 1.0 atm., and wherein the gaseous atmosphere at a pressure greater than 1.1 atm. is in direct contact with at least a portion of the outer surfaces of the first and second glasses.

38. The method according to claim 37 to increased the rate of densification of the first glass is by a factor of at least 1.5.

39. The method according to claim 37, wherein, the heating of at least the first and second glasses is conducted in an atmosphere at a pressure of at least 1.25 atm.

40. The method according to claim 39, wherein the difference between each of $T_{g1}$ and $T_{x1}$ and $T_{g2}$ and $T_{x2}$ is at least 25K.

41. The method according to claim 40, wherein the ratio of each of $T_{g1}$ to $T_{x1}$ and $T_{g2}$ to $T_{x2}$ is at least 0.5.

42. The method according to claim 41, wherein each of the first and second glasses comprise less than 40 percent by weight collectively $SiO_2$, $B_2O_3$, and $P_2O_5$, based on the total weight of the glass.

43. The method according to claim 42, wherein the first glass is a REO-$Al_2O_3$ glass.

44. The method according to claim 43, wherein the first glass collectively comprises at least 80 percent by weight of the $Al_2O_3$ and REO, based on the total weight of the glass.

45. The method according to claim 42, wherein the first glass is a REO-$Al_2O_3$—$ZrO_2$ glass.

46. The method according to claim 45, wherein the first glass collectively comprises at least 80 percent by weight of the $Al_2O_3$, REO, and $ZrO_2$, based on the total weight of the glass.

47. The method according to claim 40, wherein the first and second glasses have the same compositions.

48. The method according to claim 40, wherein the first and second glasses have different compositions.

49. The method according to claim 39, further comprising heat-treating the glass of the article to convert at least a portion of the glass to crystalline ceramic and provide glass-ceramic.

50. The method according to claim 37, wherein, the heating of at least the first and second glasses is conducted in an atmosphere at a pressure of at least 2 atm.

51. A method of making an article, the method comprising:
providing at least a first plurality of particles comprising glass, the particles comprising glass having an outer surface, wherein the glass comprises at least two different metal oxides, wherein the glass has a $T_g$ and $T_x$, and wherein the difference between the $T_g$ and the $T_x$ of the glass is at least 5K, the glass comprising one of a REO-$Al_2O_3$—$ZrO_2$, $Y_2O_3$—$Al_2O_3$—$ZrO_2$, REO-$Al_2O_3$—$Zr_2$—$SiO_2$, $Y_2O_3$—$Al_2O_3$—$ZrO_2$—$SiO_2$, REO-$Al_2O_3$, or $Y_2O_3$—$Al_2O_3$ composition, and the glass containing less than 20% by weight $SiO_2$, less than 20% by weight $B_2O_3$, and less than 40% by weight $P_2O_5$;
heating the glass above the $T_g$ and coalescing at least a portion of the first plurality of particles to provide the article, wherein the heating of the glass is conducted in a gaseous atmosphere at a pressure greater than 1.1 atm. sufficient to increase the rate of densification of the glass as compared to the same glass heated in the same manner except the pressure during the later heating is conducted in an atmosphere at a pressure of 1.0 atm., and wherein the gaseous atmosphere at a pressure greater than 1.1 atm. is in direct contact with at least a portion of the outer surface of at least a portion the particles comprising glass.

52. The method according to claim 51 to increased the rate of densification of the glass is by a factor of at least 1.5.

53. The method according to claim 51, wherein, the heating of the glass is conducted in an atmosphere at a pressure of at least 1.25 atm.

54. The method according to claim 53, wherein the difference between the $T_g$ and the $T_x$ is at least 25K.

55. The method according to claim 54, wherein the glass has a $T_1$, and wherein the ratio of the $T_g$ to $T_1$ is at least 0.5.

56. The method according to claim 55, wherein the glass comprises less than 40 percent by weight collectively $SiO_2$, $B_2O_3$, and $P_2O_5$, based on the total weight of the glass.

57. The method according to claim 56, wherein the glass is a REO-$Al_2O_3$ glass.

58. The method according to claim 57, wherein the glass collectively comprises at least 80 percent by weight of the $Al_2O_3$ and REO, based on the total weight of the glass.

59. The method according to claim 56, wherein the glass is a REO-$Al_2O_3$—$ZrO_2$ glass.

60. The method according to claim 59, wherein the glass collectively comprises at least 80 percent by weight of the $Al_2O_3$, REO, and $ZrO_2$, based on the total weight of the glass.

61. The method according to claim 53, further comprising heat-treating the glass of the article to convert at least a portion of the glass to crystalline ceramic and provide glass-ceramic.

62. The method according to claim 51, wherein the heating of the glass is conducted in an atmosphere at a pressure of at least 2 atm.

63. The method according to claim 1 wherein, the first glass further comprises at least one of BaO, CaO, $Cr_2O_3$, CoO, CuO, $Fe_2O_3$, $GeO_2$, $HfO_2$, $Li_2O$, MgO, MnO, $Nb_2O_5$, NiO, $Na_2O$, $P_2O_5$, $Sc_2O_3$, SrO, $Ta_2O_5$, $TeO_2$, $TiO_2$, $V_2O_3$, or ZnO.

64. The method according to claim 13, wherein, the glass further comprises at least one of at least one of BaO, CaO, $Cr_2O_3$, CoO, CuO, $Fe_2O_3$, $GeO_2$, $HfO_2$, $Li_2O$, MgO, MnO, $Nb_2O_5$, NiO, $Na_2O$, $P_2O_5$, $Sc_2O_3$, SrO, $Ta_2O_5$, $TeO_2$, $TiO_2$, $V_2O_3$, or ZnO.

65. The method according to claim 25, wherein, the First glass further comprises at least one of at least one of BaO, CaO, $Cr_2O_3$, CoO, CuO, $Fe_2O_3$, $GeO_2$, $HfO_2$, $Li_2O$, MgO, MnO, $Nb_2O_5$, NiO, $Na_2O$, $P_2O_5$, $Sc_2O_3$, SrO, $Ta_2O_5$, $TeO_2$, $TiO_2$, $V_2O_3$, or ZnO.

66. The method according to claim 37, wherein, the first glass further comprises at least one of at least one of BaO, CaO, $Cr_2O_3$, CoO, CuO, $Fe_2O_3$, $GeO_2$, $HfO_2$, $Li_2O$, MgO, MnO, $Nb_2O_5$, NiO, $Na_2O$, $P_2O_5$, $Sc_2O_3$, SrO, $Ta_2O_5$, $TeO_2$, $TiO_2$, $V_2O_3$, or ZnO.

67. The method according to claim 51, wherein, the glass further comprises at least one of at least one of BaO, CaO, $Cr_2O_3$, CoO, CuO, $Fe_2O_3$, $GeO_2$, $HfO_2$, $Li_2O$, MgO, MnO, $Nb_2O_5$, NiO, $Na_2O$, $P_2O_5$, $Sc_2O_3$, SrO, $Ta_2O_5$, $TeO_2$, $TiO_2$, $V_2O_3$, or ZnO.

68. A method of making an article, the method comprising:
identifying a glass comprising at least two different metal oxides, wherein the class has a $T_g$ and $T_x$, and wherein the difference between the $T_g$ and the $T_x$ of the class is at least 5K, the glass containing less than 20% by weight $SiO_2$, less than 20% by weight $B_2O_3$, and less than 40% by weight $P_2O_5$;
providing at least the glass, wherein the glass has an outer surface;

providing a substrate having an outer surface; and
heating the glass above the $T_g$ such that at least a portion of the glass wets at least a portion of the outer surface of the substrate and provides an article comprising the glass attached to the at least a portion of the outer surface of the substrate, wherein the heating of the glass is conducted in a gaseous atmosphere at a pressure greater than 1.1 atm. sufficient to increase the rate of densification of the glass as compared to the same glass heated in the same manner except the pressure during the later heating is conducted in an atmosphere at a pressure of 1.0 atm., and wherein the gaseous atmosphere at a pressure greater than 1.1 atm. is in direct contact with at least a portion of the outer surface of the glass.

69. The method according to claim 68, further comprising heat-treating the glass of the article to convert at least a portion of the glass to crystalline ceramic and provide glass-ceramic.

70. A method of making an article, the method comprising:
identifying a glass comprising at least two different metal oxides, wherein the glass has a $T_g$ and $T_x$, and wherein the difference between the $T_g$ and the $T_x$ of the glass is at least 5K, the glass containing less than 20% by weight $SiO_2$, less than 20% by weight $B_2O_3$, and less than 40% by weight $P_2O_5$;
providing at least a plurality of particles comprising the glass, the particles comprising the glass having an outer surface;
providing a substrate having an outer surface; and
heating the glass above the $T_g$ such that at least a portion of the glass of the plurality of particles wets at least a portion of the outer surface of the substrate and provides an article comprising the glass attached to the at least a portion of the outer surface of the substrate, wherein the heating of the glass is conducted in a gaseous atmosphere at a pressure greater than 1.1 atm. sufficient to increase the rate of densification of the glass as compared to the same glass heated in the same manner except the pressure during the later heating is conducted in an atmosphere at a pressure of 1.0 atm., and wherein the gaseous atmosphere at a pressure greater than 1.1 atm. is in direct contact with at least a portion of the outer surface of at least a portion the particles comprising glass.

71. The method according to claim 70, further comprises heat-treating the glass of the article to convert at least a portion of the glass to crystalline ceramic and provide glass-ceramic.

72. A method of making an article, the method comprising:
identifying a first glass comprising at least two different metal oxides, wherein the first glass has as a $T_{g1}$ and $T_{x1}$, and wherein the difference between the $T_{g1}$ and the $T_{x1}$ is at least 5K, the first glass containing less than 20% by weight $SiO_2$, less than 20% by weight $B_2O_3$, and less than 40% by weight $P_2O_5$;
providing at least the first glass and a second glass each having an outer surface; and
heating the first and second glasses above at least $T_{g1}$ and at least the first glass coalescing with the second glass to provide the article, wherein the heating of at least the first and second glasses is conducted in a gaseous atmosphere at a pressure greater than 1.1 atm. sufficient to increase the rate of densification of the glasses as compared to the same glasses heated in the same manner except the pressure during the later heating is conducted in an atmosphere at a pressure of 1.0 atm., and wherein the gaseous atmosphere at a pressure greater than 1.1 atm. is in direct contact with at least a portion of the outer surfaces of the first and second glasses.

73. The method according to claim 72, further comprises heat-treating at least the first and second glasses of the article to convert at least a portion of the glass to crystalline ceramic and provide glass-ceramic.

74. A method of making an article, the method comprising:
identifying a first glass comprising at least two different metal oxides, wherein the first glass has a $T_{g1}$ and $T_{x1}$, and wherein the difference between the $T_{g1}$ and the $T_{x1}$ is at least 5K, the first glass containing less than 20% by weight $SiO_2$, less than 20% weight $B_2O_3$, and less than 40% by weight $P_2O_5$, and wherein the second glass comprises at least two different metal oxides, wherein the second glass has a $T_{g2}$ and $T_{x2}$, and wherein the difference between the $T_{g2}$ and the $T_{x2}$ is at least 5K, the second glass containing less than 20% by weight $SiO_2$, less than 20% by weight $B_2O_3$, and less than 40% by weight $P_2O_5$;
providing at least the first glass and a second glass each having an outer surface; and
heating at least the first and second glasses above the higher of $T_{g1}$ or $T_{g2}$ and coalescing the first and second glasses to provide the article, wherein the heating of at least the first and second classes is conducted in a gaseous atmosphere at a pressure greater than 1.1 atm. sufficient to increase the rate of densification of the glasses as compared to the same glasses heated in the same manner except the pressure during the later heating is conducted in an atmosphere at a pressure of 1.0 atm., and wherein the gaseous atmosphere at a pressure greater than 1.1 atm. is in direct contact with at least a portion of the outer surfaces of the first and second glasses.

75. The method according to claim 74, further comprising heat-treating the glass of the article to convert at least a portion of the glass to crystalline ceramic and provide glass-ceramic.

76. A method of making an article, the method comprising:
identifying a class comprising at least two different metal oxides, wherein the glass has a $T_g$ and $T_x$, and wherein the difference between the $T_g$ and the $T_x$ of the glass is at least 5K, the glass containing less than 20% by weight $SiO_2$, less than 20% by weight $B_2O_3$, and less than 40% by weight $P_2O_5$;
providing at least a first plurality of particles comprising the glass, the particles comprising the class having an outer surface; and
heating the glass above the $T_g$ and coalescing at least a portion of the first plurality of particles to provide the article, wherein the heating of the glass is conducted in a gaseous atmosphere at a pressure greater than 1.1 atm. sufficient to increase the rate of densification of the glass as compared to the same glass heated in the same manner except the pressure during the later heating is conducted in an atmosphere at a pressure of 1.0 atm., and wherein the gaseous atmosphere at a pressure greater than 1.1 atm. is in direct contact with at least a portion of the outer surface of at least a portion the particles comprising glass.

77. The method according to claim 76, further comprising heat-treating the glass of the article to convert at least a portion of the glass to crystalline ceramic and provide glass-ceramic.

* * * * *

UNITED STATES PATENT AND TRADEMARK OFFICE
CERTIFICATE OF CORRECTION

PATENT NO. : 7,497,093 B2
APPLICATION NO. : 10/901638
DATED : March 3, 2009
INVENTOR(S) : Anatoly Z. Rosenflanz It is certified that error appears in the above-identified patent and that said Letters Patent is hereby corrected as shown below:

Column – First Page Col. 2 (Other Publications) – Line 9 - After "Glass" insert -- Ceramics --.

Column Page 2 Col. 2 (Foreign Patent Documents) – Line 24 - Delete "RU" and insert -- SU --, therefor, Column Page 2 Col. 2 (Foreign Patent Documents) – Line 26 - Delete "RU" and insert -- SU --, therefor.

Column Page 3 Col. 1 (Other Publications) – Line 7 - Delete "Transmiting" and insert -- Transmitting --, therefor.

Column Page 3 Col. 1 (Other Publications) – Line 11 - Delete "Sciences" and insert -- Science --, therefor.

Column Page 3 Col. 1 (Other Publications) – Line 22 - Delete "ZrO2" and insert -- $ZrO_2$ --, therefor.

Column Page 3 Col. 1 (Other Publications) – Line 59 - Delete "Galsses" and insert -- Glasses --, therefor.

Column Page 3 Col. 1 (Other Publications) – Line 62 - Delete "Anaylsis" and insert -- Analysis --, therefor.

Column Page 3 Col. 2 (Other Publications) – Line 30 - Delete "van" and insert -- Van --, therefor.

Column Page 3 Col. 2 (Other Publications) – Line 54 - Delete "(REA1™)" and insert -- (REAl™) --, therefor.

Column Page 4 Col. 1 (Other Publications) – Line 13 - Delete "$Al_2O_3ZrO_2(Y_2O_3)$" and insert -- $Al_2O_3$-$ZrO_2(Y_2O_3)$ --, therefor.

Column Page 4 Col. 1 (Other Publications) – Line 16 - Delete "$REA1O_3$" and insert -- $REAlO_3$ --, therefor.

Column Page 4 Col. 2 (Other Publications) – Line 2 - Delete "Yttrie" and insert -- Yttria --, therefor.

UNITED STATES PATENT AND TRADEMARK OFFICE
CERTIFICATE OF CORRECTION

PATENT NO.         : 7,497,093 B2
APPLICATION NO. : 10/901638
DATED                  : March 3, 2009
INVENTOR(S)       : Anatoly Z. Rosenflanz It is certified that error appears in the above-identified patent and that said Letters Patent is hereby corrected as shown below:

Column 22 – Line 42 (Approx.) - In Claim 2, delete "increased" and insert -- increase --, therefor.

Column 23 – Line 11 - In Claim 13, after "comprising" insert -- one of a --.

Column 23 – Line 12 - In Claim 13, delete "$Zr_2$" and insert -- $ZrO_2$ --, therefor.

Column 23 – Line 32 - In Claim 14, delete "increased" and insert -- increase --, therefor.

Column 24 – Line 1 - In Claim 25, delete "$Zr_2$" and insert -- $ZrO_2$ --, therefor.

Column 24 – Line 11 - In Claim 25, delete "glass" and insert -- glasses --, therefor.

Column 24 – Line 12 - In Claim 25, delete "glass" and insert -- glasses --, therefor.

Column 24 – Line 18 - In Claim 26, delete "increased" and insert -- increase --, therefor.

Column 24 – Line 26 - In Claim 29, delete "$T_1$" and insert -- $T_{11}$ --, therefor.

Column 24 – Line 57 - In Claim 37, delete "$Zr_2$" and insert -- $ZrO_2$ --, therefor.

Column 25 – Line 6 - In Claim 37, delete "glass" and insert -- glasses --, therefor.

Column 25 – Line 13 - In Claim 38, delete "increased" and insert -- increase --, therefor.

Column 25 – Line 57 - In Claim 51, delete "$Zr_2$" and insert -- $ZrO_2$ --, therefor.

Column 26 – Line 6 - In Claim 52, delete "increased" and insert -- increase --, therefor.

Column 26 – Line 37 - In Claim 63, delete "$Nb_2o_5$" and insert -- $Nb_2O_5$ --, therefor.

Column 26 – Line 40 - In Claim 64, before "BaO" delete "at least one of".

Column 26 – Line 44 - In Claim 65, delete "First" and insert -- first --, therefor.

Column 26 – Line 45 - In Claim 65, before "BaO" delete "at least one of".

UNITED STATES PATENT AND TRADEMARK OFFICE
CERTIFICATE OF CORRECTION

PATENT NO. : 7,497,093 B2
APPLICATION NO. : 10/901638
DATED : March 3, 2009
INVENTOR(S) : Anatoly Z. Rosenflanz It is certified that error appears in the above-identified patent and that said Letters Patent is hereby corrected as shown below:

Column 26 – Line 50 - In Claim 66, before "BaO" delete "at least one of".

Column 26 – Line 52 - In Claim 66, delete "$TeO_2$," and insert -- $TeO_2$, --, therefor.

Column 26 – Line 55 - In Claim 67, before "BaO" delete "at least one of".

Column 26 – Line 61 - In Claim 68, delete "class" and insert -- glass --, therefor.

Column 26 – Line 62 - In Claim 68, delete "class" and insert -- glass --, therefor.

Column 26 – Line 67 - In Claim 68, delete "surface:" and insert -- surface; --, therefor.

Column 27 – Line 51 - In Claim 72, after "has" delete "as".

Column 28 – Line 26 - In Claim 74, delete "classes" and insert -- glasses --, therefor.

Column 28 – Line 40 - In Claim 76, delete "class" and insert -- glass --, therefor.

Column 28 – Line 47 - In Claim 76, delete "class" and insert -- glass --, therefor.

Signed and Sealed this

Seventeenth Day of November, 2009

David J. Kappos
*Director of the United States Patent and Trademark Office*